United States Patent [19]
Dornier et al.

[11] Patent Number: 5,579,489
[45] Date of Patent: *Nov. 26, 1996

[54] HAND-HELD PORTABLE COMPUTER HAVING CAPABILITY FOR EXTERNAL EXPANSION OF AN INTERNAL BUS

[75] Inventors: Pascal Dornier, Sunnyvale; Dan Kikinis, Sratoga; William J. Seiler, Scotts Valley, all of Calif.

[73] Assignee: Elonex I.P. Holdings, Ltd., London, England

[*] Notice: The term of this patent shall not extend beyond the expiration date of Pat. No. 5,457,785.

[21] Appl. No.: 280,925

[22] Filed: Jul. 26, 1994

Related U.S. Application Data

[63] Continuation-in-part of Ser. No. 144,231, Oct. 28, 1993, and Ser. No. 16,122, Feb. 10, 1993, Pat. No. 5,457,785.

[51] Int. Cl.$^6$ .............................. G06F 3/00; G06F 13/00
[52] U.S. Cl. .......................... 395/281; 395/308; 395/893; 395/200.01; 364/708.1; 361/686; 345/173; 455/89
[58] Field of Search .................... 395/325, 800, 395/275, 425, 725, 155, 281, 308, 893, 200.01; 345/160, 169, 173; 379/93, 96; 364/709.09, 708.1; 320/21; 361/686; 455/89

[56] References Cited

U.S. PATENT DOCUMENTS

| | | | |
|---|---|---|---|
| 4,163,138 | 7/1979 | Harden | 200/310 |
| 4,534,012 | 8/1985 | Yokozawa | 395/275 |
| 4,545,023 | 10/1985 | Mizzi | 364/709.13 |
| 4,644,326 | 2/1987 | Villalobos et al. | 341/34 |
| 4,748,656 | 5/1988 | Gibbs et al. | 379/93 |
| 4,866,600 | 9/1989 | Ballard et al. | 395/700 |
| 5,029,183 | 7/1991 | Tymes | 375/1 |
| 5,065,357 | 11/1991 | Shiraishi et al. | 395/200 |
| 5,191,656 | 3/1993 | Forde, III et al. | 395/325 |
| 5,227,957 | 7/1993 | Deters | 361/395 |
| 5,359,717 | 10/1994 | Bowles et al. | 395/325 |

*Primary Examiner*—Gopal C. Ray
*Attorney, Agent, or Firm*—Donald R. Boys

[57] ABSTRACT

A personal digital assistant module with a local CPU, memory, and I/O interface has a host interface comprising a bus connected to the local CPU and a connector at a surface of the personal digital assistant for interfacing to a bus connector of a host general-purpose computer, providing direct bus communication between the personal digital assistant and the host general-purpose computer. In an embodiment, the personal digital assistant also stores a security code. The personal digital assistant according to the invention forms a host/satellite combination with a host computer having a docking bay, wherein upon docking a docking protocol controls access by the host to memory of the personal digital assistant based on one or more passwords provided by a user to the host. In another embodiment the personal digital assistant also has an expansion port connected to the local CPU, and expansion peripheral devices may be connected and operated through the expansion port.

8 Claims, 33 Drawing Sheets

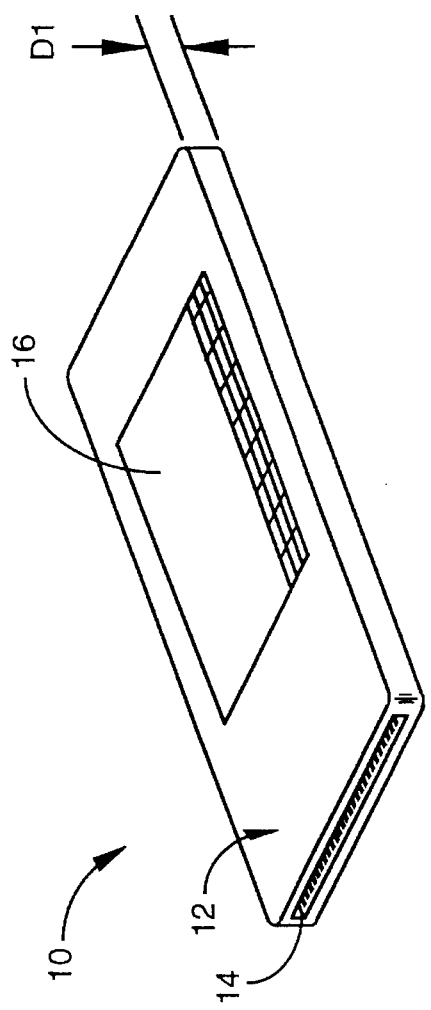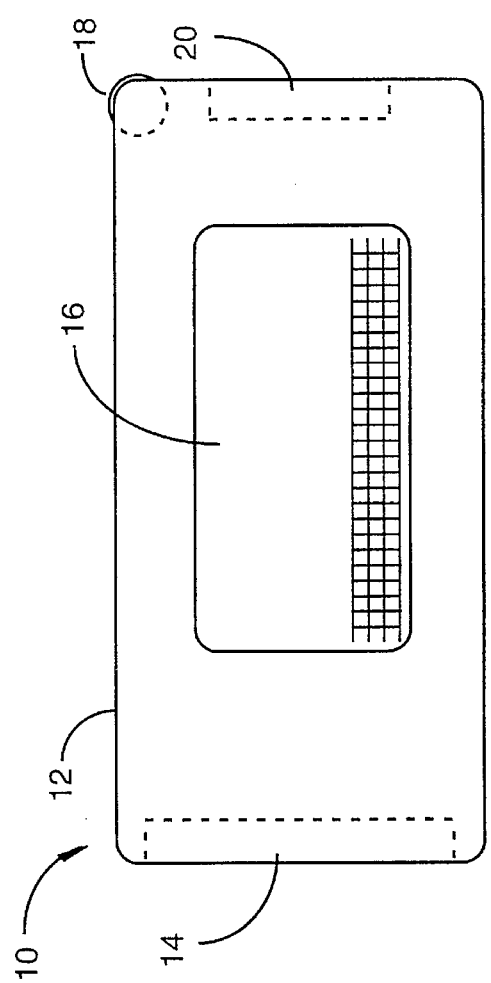

| Bit | Enables / Disables |
|---|---|
| 0 | For binary value: 0 = hold $E^2P^2$ in reset state |
| 1 | 1 = SPP   2 = EPP   3 = $E^2P^2$<br>4 thru 6 = undefined |
| 2 | 7 = reset slave |
| 3 | Net0 = 8 or 16 Bit Data Size |
| 4 | Opt0 = 8 or 16 Bit Data Size |
| 5 | Net1 = 8 or 16 Bit Data Size |
| 6 | Reserved |
| 7 | Reserved |
| 8 | Network Port 0 |
| 9 | Option 0 |
| 10 | Network Port 1 |
| 11 | Secondary IDE Hard Disk |
| 12 | Secondary Floppy Disk |
| 13 | LPT Port 1 |
| 14 | Primary Floppy Disk |
| 15 | Serial COM Port 1 |

Fig.25

| Bit | Host IRQ # Enabled |
|---|---|
| 0 | |
| 1 | |
| 2 | |
| 3 | |
| 4 | |
| 5 | |
| 6 | |
| 7 | |
| 8 | IRQ 5 |
| 9 | IRQ 6 |
| 10 | IRQ 7 |
| 11 | IRQ 15 |
| 12 | 1 = Clock On;  0 = Clock Off |
| 13 | (Future use to enable IRQ4) |
| 14 | |
| 15 | |

Fig. 26

| PIN # | SPP Signal | EPP Signal | $E^2P^2$ Signal | Type | $E^2P^2$ Description |
|---|---|---|---|---|---|
| 1 | STROBE/ | WRITE/ | STROBE/ | O | Negative going half of differential bus strobe pair |
| 2-9 | D(7:0) | AD(7:0) | AD(7:0) | I/O | Address/Data/Status. Bidirectional, byte wide |
| 10 | ACK/ | INTR | INTR | I | Interrupt. Driven active asynchronously by slave on status change |
| 11 | BUSY | WAIT/ | IOICHRDY | I/O | Buffered X-IOCHRDY. Driven active asynchronously by X-ISA device to extend cycle. |
| 12 | PE | USER0 | CY0 | O | Cycle type. Encoded signals from the MASTER select the slave operation which will be executed on the next strobe. |
| 13 | SELECT | USER1 | CY1 | O | |
| 14 | AUTOFD/ | DATASTB/ | CY2 | O | |
| 15 | ERROR/ | USER2 | CY4 | O | |
| 16 | INIT/ | USER3 | STROBE | O | Positive going half of differential bus strobe pair, AD and CY are clocked by this signal. |
| 18-19 | GND | GND | PWR | P | Bidirectional power pins. Host can supply or receive power over these lines. |
| 20-25 | GND | GND | GND | P | Ground |

Fig. 27

| Type | CY lines Hex Value |
|---|---|
| RESET_A | 0 |
| SPP_STATE | 1 |
| PF_START_DELAY | 2 |
| PF_DACK2_ON | 3 |
| PF_IOR_ON | 4 |
| PF_DACK2_OFF | 5 |
| IDLE | 6 |
| ALS | 7 |
| ADDR_HOLD | 8 |
| WRITE_DATAL | 9 |
| WRITE_DATAH | A |
| IOW_ON | B |
| IOW_DWELL | C |
| IOW_CMD_OFF | D |
| IOR_ON | E |
| IOR_DWELL | F |
| READ_DATAL | 10 |
| READ_DATAH | 11 |
| IOR_CMD_OFF | 12 |
| READ_STATUS | 13 |
| STATUS_TURNAROUND | 14 |
| WRITE_STATUS-IMAGE | 15 |
| WAIT_CMD_END | 16 |
| DACK2_ON | 17 |
| TC_ON | 18 |
| unused | 19 |
| RESET_B | 1A |
| RESET_C | 1B |
| ATTN_SETTLE | 1C |
| unused | 1D |
| DACK_TC_ON | 1E |
| unused | 1F |

Fig. 28

| DEVICE | ISA I/O ADDRESS | $E^2P^2$ ADDRESS | DATA WIDTH |
|---|---|---|---|
| NET0 | 300-31F | 00-1F | Configurable |
| OPT0 | 220-227 | 20-27 | Configurable |
| OPT1 | 228-22F | 28-2F | Configurable |
| NET1 | 340-35F | 40-5F | Configurable |
| SHD | 170 | 60 | 16 Bit |
| SHD | 171-177 | 61-67 | 8 Bit |
| SFDC/SHD | 370-377 | 70-77 | 8 Bit |
| LPT1/EPP | 378-37F | 78-7F | 8 Bit |
| PFDC/PHD | 3F0-3F7 | F0-F7 | 8 Bit |

Fig. 29

| Pin | Signal | I/O TYPE | Input | Output | Tri-State | Pull Up |
|---|---|---|---|---|---|---|
| 1 | IOW/ | I | ILST | | | |
| 2 | DACK2/ | I | | IST | | |
| 3 | TC | I | IST | | | |
| 4 | RESET | I | IST | | | |
| 5 | CLK | I | ILST | | | |
| 6 | GND | GND | | | | |
| 7 | DRQ2 | O | | | OS16/4 | |
| 8 | IRQ15 | O | | | OS16/4 | |
| 9 | IRQ7 | O | | | OS16/4 | |
| 10 | IRQ3 | O | | | OS16/4 | |
| 11 | IRQ6 | O | | | OS16/4 | |
| 12 | VCC | PWR | | | | |
| 13 | IRQ5 | O | | | OS16/4 | |
| 14 | IOCHRDY | O | | | | OS16/4 |
| 15 | GND | GND | | | | |
| 16 | IOCS16/ | O | | | | OS16/4 |
| 17 | SD0 | I/O | IST | | OS16/4 | |
| 18 | SD1 | I/O | IST | | OS16/4 | |
| 19 | SD2 | I/O | IST | | OS16/4 | |
| 20 | SD3 | I/O | IST | | OS16/4 | |
| 21 | GND | GND | | | | |
| 22 | SD4 | I/O | IST | | OS16/4 | |
| 23 | SD5 | I/O | IST | | OS16/4 | |
| 24 | SD6 | I/O | IST | | OS16/4 | |
| 25 | SD7 | I/O | IST | | OS16/4 | |
| 26 | GND | GND | | | | |
| 27 | SD8 | I/O | IST | | OS16/4 | |
| 28 | SD9 | I/O | IST | | OS16/4 | |
| 29 | SD10 | I/O | IST | | OS16/4 | |
| 30 | SD11 | I/O | IST | | OS16/4 | |
| 31 | GND | GND | | | | |
| 32 | SD12 | I/O | IST | | OS16/4 | |
| 33 | SD13 | I/O | IST | | OS16/4 | |
| 34 | SD14 | I/O | IST | | OS16/4 | |
| 35 | SD15 | I/O | IST | | OS16/4 | |
| 36 | VCC | PWR | | | | |
| 37 | GND | GND | | | | |
| 38 | PS3 | I/O | ILST | | OS24 | |
| 39 | PS2 | I/O | ILST | | OS24 | |
| 40 | GND | GND | | | | |

Fig. 30

| Pin | Signal | I/O TYPE | Input | Output | Tri-State | Pull Up |
|---|---|---|---|---|---|---|
| 41 | GND |  | ILST |  |  |  |
| 42 | n/c | I | ILST | IST |  | IPU1 |
| 43 | PS1 | I | ILST |  |  | IPD1 |
| 44 | PS0 | I/O |  |  | OS24/12 |  |
| 45 | AD7 | PWR |  |  |  |  |
| 46 | VCC | GND | ILST |  |  |  |
| 47 | GND | I/O | ILST |  | OS24/12 |  |
| 48 | AD6 | I/O |  |  | OS24/12 |  |
| 49 | AD5 | GND | ILST |  |  |  |
| 50 | GND | I/O | ILST |  | OS24/12 |  |
| 51 | AD4 | I/O |  |  | OS24/12 |  |
| 52 | AD3 | GND |  |  |  |  |
| 53 | GND | O | IST |  | OS24/12 |  |
| 54 | PC3 | I/O |  |  | OS24/12 |  |
| 55 | AD2 | PWR |  |  |  |  |
| 56 | VCC | GND |  |  |  |  |
| 57 | GND | O | IST |  | OS24/12 |  |
| 58 | PC2 | I/O |  |  | OS24/12 |  |
| 59 | AD1 | GND | IST |  |  |  |
| 60 | GND | I/O | IST |  | OS24/12 |  |
| 61 | PS4 | I/O |  |  | OS24/12 |  |
| 62 | AD0 | GND |  |  |  |  |
| 63 | GND'PC1 | O |  |  | OS24/12 |  |
| 64 | PC0 | O |  |  | OS24/12 |  |
| 65 | GND | GND | IST |  |  |  |
| 66 | SA0 | I | IST |  |  |  |
| 67 | SA1 | I | IST |  |  |  |
| 68 | SA2 | I | IST |  |  |  |
| 69 | SA3 | I | IST |  |  |  |
| 70 | SA4 | I | IST |  |  |  |
| 71 | SA5 | I |  |  |  |  |
| 72 | VCC | PWR | IST |  |  |  |
| 73 | SA6 | I |  |  |  |  |
| 74 | GND | GND | IST |  |  |  |
| 75 | SA7 | I | IST |  |  |  |
| 76 | SA8 | I | IST |  |  |  |
| 77 | SA9 | I | IST |  |  |  |
| 78 | AEN | I | IST |  |  |  |
| 79 | CS/ | I | IST |  |  |  |
| 80 | IOR/ | I |  |  |  |  |

Fig. 31

| Pin | Signal | I/O TYPE | Input | Output | Tri-State | Pull Up |
|---|---|---|---|---|---|---|
| 1 | IOW/ | O | | OB16/4 | | |
| 2 | DACK2/ | O | | OB16/4 | | |
| 3 | TC | O | | OB16/4 | | |
| 4 | RSTDRV | O | | OB16/4 | | |
| 5 | STB | I | IST | | | |
| 6 | GND | ND | | | | |
| 7 | DRQ2 | I | uIST | | | IPU1 |
| 8 | IRQ15 | I | uIST | | | IPU1 |
| 9 | IRQ7 | I | uIST | | | IPU1 |
| 10 | IRQ3 | I | uIST | | | IPU1 |
| 11 | IRQ6 | I | uIST | | | IPU1 |
| 12 | VCC | PWR | | | | |
| 13 | IRQ5 | I | uIST | | | IPU1 |
| 14 | IOCHRDY | I | uIST | | | |
| 15 | GND | GND | | | | IPU1 |
| 16 | N/C | | | | | |
| 17 | SD0 | I/O | uIST | | OS16/4 | |
| 18 | SD1 | I/O | uIST | | OS16/4 | |
| 19 | SD2 | I/O | uIST | | OS16/4 | |
| 20 | SD3 | I/O | uIST | | OS16/4 | |
| 21 | GND | GND | | | | |
| 22 | SD4 | I/O | uIST | | OS16/4 | |
| 23 | SD5 | I/O | uIST | | OS16/4 | |
| 24 | SD6 | I/O | uIST | | OS16/4 | |
| 25 | SD7 | I/O | uIST | | OS16/4 | |
| 26 | GND | GND | | | | |
| 27 | SD8 | I/O | uIST | | OS16/4 | |
| 28 | SD9 | I/O | uIST | | OS16/4 | |
| 29 | SD10 | I/O | uIST | | OS16/4 | |
| 30 | SD11 | I/O | uIST | | OS16/4 | |
| 31 | GND | GND | | | | |
| 32 | SD12 | I/O | uIST | | OS16/4 | |
| 33 | SD13 | I/O | uIST | | OS16/4 | |
| 34 | SD14 | I/O | uIST | | OS16/4 | |
| 35 | SD15 | I/O | uIST | | OS16/4 | |
| 36 | VCC | PWR | | | | |
| 37 | GND | GND | | | | |
| 38 | PWRON_RST | I | uIST | | | IPU1 |
| 39 | N/C | | | | | |
| 40 | GND | GND | | | | |

Fig. 32

| Pin | Signal | I/O TYPE | Input | Output | Tri-State | Pull Up |
|---|---|---|---|---|---|---|
| 41 | N/C | | | | | |
| 42 | PS1 | O | | OB24/12 | | |
| 43 | PS0 | O | | OB24/12 | | |
| 44 | AD7 | I/O | uIST | | OS24/12 | |
| 45 | VCC | PWR | | | | |
| 46 | GND | GND | | | | |
| 47 | AD6 | I/O | uIST | | OS24/12 | |
| 48 | AD5 | I/O | uIST | | OS24/12 | |
| 49 | GND | GND | | | | |
| 50 | AD4 | I/O | uIST | | OS24/12 | |
| 51 | AD3 | I/O | uIST | | OS24/12 | |
| 52 | GND | GND | | | | |
| 53 | PC3 | I | uIST | | | |
| 54 | AD2 | I/O | uIST | | OS24/12 | |
| 55 | VCC | PWR | | | | |
| 56 | GND | GND | | | | |
| 57 | PC2 | I | uIST | | | |
| 58 | AD1 | I/O | uIST | | OS24/12 | |
| 59 | GND | GND | | | | |
| 60 | PS4 | I | uIST | | | |
| 61 | AD0 | I/O | uIST | | OS24/12 | |
| 62 | GND | GND | | | | |
| 63 | PC1 | I | uIST | | | |
| 64 | PC0 | I | uIST | | | |
| 65 | GND | GND | | | | |
| 66 | SA0 | O | | OB16/4 | | |
| 67 | SA1 | O | | OB16/4 | | |
| 68 | SA2 | O | | OB16/4 | | |
| 69 | SA3 | O | | OB16/4 | | |
| 70 | SA4 | O | | OB16/4 | | |
| 71 | SA5 | O | | OB16/4 | | |
| 72 | VCC | PWR | | | | |
| 73 | SA6 | O | | OB16/4 | | |
| 74 | GND | GND | | | | |
| 75 | SA7 | O | | OB16/4 | | |
| 76 | SA8 | O | | OB16/4 | | |
| 77 | SA9 | O | | OB16/4 | | |
| 78 | AEN | O | | OB16/4 | | |
| 79 | N/C | | | | | |
| 80 | IOR/ | O | | OB16/4 | | |

Fig. 33

HAND-HELD PORTABLE COMPUTER HAVING CAPABILITY FOR EXTERNAL EXPANSION OF AN INTERNAL BUS

CROSS-REFERENCE TO RELATED DOCUMENTS

This application is a continuation-in-part of pending application Ser. No. 08/144,231 filed Oct. 28, 1993, and of application Ser. No. 08/016,122 filed Feb. 10, 1993, now U.S. Pat. No. 5,457,785.

FIELD OF THE INVENTION

This invention is in the area of portable computers and pertains more specifically to small portable computing devices known in the art as personal digital assistants.

BACKGROUND OF THE INVENTION

Personal Digital Assistant (PDA) units, as of the date of this disclosure, enjoy a position of hope in the computer marketplace. Some believe this approach, a small, relatively inexpensive, and eminently portable computer unit, having software specifically written for tasks a user might expect to perform while travelling, will provide eminently useful and therefore salable computer products. Apple Computer, Hewlett Packard, and several other well-known computer manufacturers have made a considerable investment at no small risk in such systems.

Given the new systems now introduced, and those coming, for what is now known about them, there are still a number of drawbacks and problems. For example:

1. The PDA systems introduced are relatively costly, with starting prices ranging from several hundred dollars to two thousand dollars and more. At such prices, rivalling current pricing for desktop systems, the buying public may react negatively. It is true that prices will fall with increased manufacturing volume and competition, but the high end start may well be rejected by potential users.

2. The systems being offered are still relatively bulky, considering the limited range of tasks that may be accomplished. Most are certainly too big to be conveniently carried in a breast pocket. The Newton, manufactured by Apple Corporation, weighs about a pound and is approximately the size of a VHS video cassette.

3. A big drawback of the PDA systems being offered is the way they transfer data between a user's desktop unit, or other host, and the PDA. Known communication is by modem, by infrared communication, and by serial connection. These all require manipulation by a user, modulation on one or both ends of the communication path, and the like, which can be time-consuming, error-prone, and hardware extensive (expensive). Presently the Newton offers a modem and/or LED communication as an option, adding to the overall cost.

4. In known PDAs, software is typically recorded in ROM, so updating applications can be difficult, and sometimes impossible. This will be a problem because PDA users will not want the PDA to have the same capabilities at all times. Typical users will be people who travel and work while they travel. These users require different functions for a trip to Taiwan than for a trip to France, for example. What is needed is a quick and convenient means to update and substitute software.

5. Another difficulty is in the fact that the data files a user manipulates while travelling are typically data files also resident in a home unit, herein called a host unit, such as the user's office desktop machine or notebook or other portable computer. It is very troublesome to have two or more sets of critical data, with differences that one must remember to correct at an appropriate time. This can cause unending grief if files are not correctly updated. At best, current PDAs must use a relatively slow compressed bus to download and upgrade files. Typically this is done through a serial port, using a linking application like Laplink™.

What is needed is a small and inexpensive PDA that has a range of features that eliminate the above-described risks and problems. This new unit needs to be smaller than those presently being introduced, such as about credit-card size, or perhaps modeled on the PCMCIA type II or type III standard form factors. It should be inexpensive enough to produce that at least a minimum version could be sold in the roughly $100–$200 range, so it will be a unit seen to be a relatively inexpensive necessity. A PDA unit of this sort is the subject of the present invention, and is termed by the inventors a micro-PDA, or μPDA.

A very important feature of the μPDA in an aspect of the present invention is a direct parallel bus interface with a connector allowing the unit to be docked by plugging it into a docking bay in a host unit. Moreover, when the μPDA is docked in the host, there needs to be a means to effectively disable the CPU in the μPDA and to provide direct access to both the μPDA software and data storage by the host CPU. This direct access would provide immediate ability to communicate in the fastest available fashion between the μPDA and the host, and would also facilitate additional important features to be described below.

The μPDA also needs to have an optional compressed bus interface, including a connector separate from the host interface, so add-on devices may be utilized, such as a FAX modem, cellular communication, printer, and so on.

An additional feature that could be optionally provided in another aspect of the invention is an interface at the lost to allow a user to select pre-arranged software mixes for loading to the μPDA. This feature comprises a set of control routines operating in conjunction with the host's display and input means, to allow the user to quickly select applications and perhaps data as well to be loaded to the μPDA satellite, to configure the smaller, more portable unit for specific itineraries and purposes.

Another desirable feature is an ability to automatically update data files. In this aspect of the invention, with the μPDA docked, data on the host, if carrying a later date and/or time stamp than the data on the μPDA, would be automatically updated on the μPDA and vice-versa. When one returns from an excursion using the μPDA and docks the satellite at the host, the host gains access, determines the location of the latest files, and accomplishes the update. This feature needs to have some built-in user prompting to be most effective. It makes the μPDA a true satellite system.

SUMMARY OF THE INVENTION

In a preferred embodiment of the invention a personal digital assistant module is provided comprising an enclosure for enclosing and supporting internal elements, a microcontroller within the enclosure for performing digital operations to manage functions of the personal digital assistant module, and a memory means connected to the microcontroller by a memory bus structure for storing data and executable routines. There is a power supply means within the enclosure for supplying power to functional elements of the personal digital assistant module, a display means operable by the microcontroller and implemented on a surface of the enclosure, and input means connected to the microcontroller for providing commands and data to the personal digital assistant module. A host interface means comprising a host interface bus structure, which may be configured as a PCMCIA bus interface, is connected to the microcontroller and to a first portion of a host interface connector at a surface of the enclosure, and the host interface means is configured to directly connect the microcontroller to a compatible bus structure of a host computer.

In one embodiment the personal digital assistant module has an expansion bus interface comprising an expansion bus structure connected to the microcontroller and to a first portion of an expansion bus connector for connecting the microcontroller to a peripheral device. A wide variety of peripheral devices are provided for use with the personal digital assistant of the invention.

in another aspect, the personal digital assistant module also has a nonvolatile storage device, such as an EEPROM connected to the microcontroller and containing one or more codes unique to the personal digital assistant, for uniquely identifying the personal digital assistant to digital devices connected on the host interface.

In a preferred embodiment, the display and input means for the personal digital assistant are configured as an overlaid touch screen and LCD display on a surface of the outer case of the personal digital assistant. A pointer device implemented as a thumbwheel in one embodiment and as a pressure sensitive pad in another is provided as part of the input capability.

The personal digital assistant module forms a unique combination with a general-purpose computer host having the personal digital assistant as a satellite unit. The host in this instance has a docking bay especially configured to dock the personal digital assistant, making a direct bus connection between the local CPU of the personal digital assistant and the CPU of the host. The host may be a desktop unit, a notebook computer, or a smaller portable like a palmtop computer. This combination provides power and convenience not before available.

Many other digital devices are also provided according to various aspects of the invention, such as modems, scanners, data acquisition peripherals, cellular phones, and a software vending machine, and all of these devices may be appended to the personal digital assistant by the expansion bus interface or, in many cases, by the host interface.

The personal digital assistant provided according to embodiments of the present invention is a unit more compact than conventional PDAs. It represents a new dimension in computer application and applicability, in a form promising to be eminently usable by and useful to almost everyone; and at a price easily affordable. It solves the communication problem intrinsic to personal digital assistants relative to larger and more powerful computers, with a unit that fits into a user's breast pocket, and at a very low price.

BRIEF DESCRIPTION OF THE DRAWINGS

FIG. 1A is an isometric view of a μPDA according to an embodiment of the present invention.

FIG. 1B is a plan view of the μPDA of Fig, 1A.

FIG. 25 is a table of bit assignments for the Mode Register for the PIO port of FIG. 23.

FIG. 26 is a table of bit assignments for the Interrupt Enable Register for the PIO port of FIG. 23.

FIG. 27 is a table of cable pin and register bit assignments for each of 3 operating modes for the PIO port of FIG. 23.

FIG. 28 is a table of state descriptions for the PIO port of FIG. 23.

FIG. 29 is a table of internal to external device I/O address translations and data sizes.

FIG. 30 is a pinout listing for pins 1–40 of a master state-translation and control device according to the invention.

FIG. 31 is a pinout listing of pins 41–80 for the master device of FIG. 30.

FIG. 32 is a pinout listing for pins 1–40 of a slave state-translation device according to the invention.

FIG. 33 is a pinout listing for pins 41–80 of the slave device of FIG. 32.

DESCRIPTION OF THE PREFERRED EMBODIMENTS

FIG. 1A is an isometric view of a μPDA 10 according to an embodiment of the present invention. In this embodiment the unit is modeled on the PCMCIA standard Type II form factor, having a height D1 of about 5 mm. Body 12 is described in further detail below, and has a female portion 14 of a connector recessed at one end for engaging a mating male portion of the connector in a host computer, connecting the μPDA internal circuitry directly with a host internal bus. The host unit may be a notebook computer having a docking bay for the μPDA. Docking bays may be provided in desktop and other types of computers, and even in other kinds of digital equipment, several examples of which are described below.

Still referring to FIG. 1A, in this embodiment there is a combination I/O interface 16 implemented on one side of the μPDA, comprising a display overlaid with a touch-sensitive planar structure providing softkey operation in conjunction with interactive control routines operable on the μPDA in a stand-alone mode.

Although not shown in FIG. 1A, there may also be guides implemented along the sides of the case of the device for guiding the module in and out of a docking bay in a host computer unit. There may also be one or more mechanical features facilitating engagement and disengagement of the module in a docking bay.

FIG. 1B is a top plan view of the μPDA of FIG. 1A, showing a thumbwheel 18 implemented in one corner of the μPDA. The thumbwheel in this embodiment is an input device capable of providing input with both amplitude and directional characteristics, and in some cases rate characteristics as well. The thumbwheel has many uses in combination with the μPDA and I/O interface 16. One such use is controlled scrolling of icons, characters, menus, and the like on the display of the device. The thumbwheel provides many of the functions of a pointer device.

In this embodiment of the μPDA a second external connector portion 20 is provided. This connector portion is for engaging peripheral devices as part of an expansion bus interface.

Figure 2:
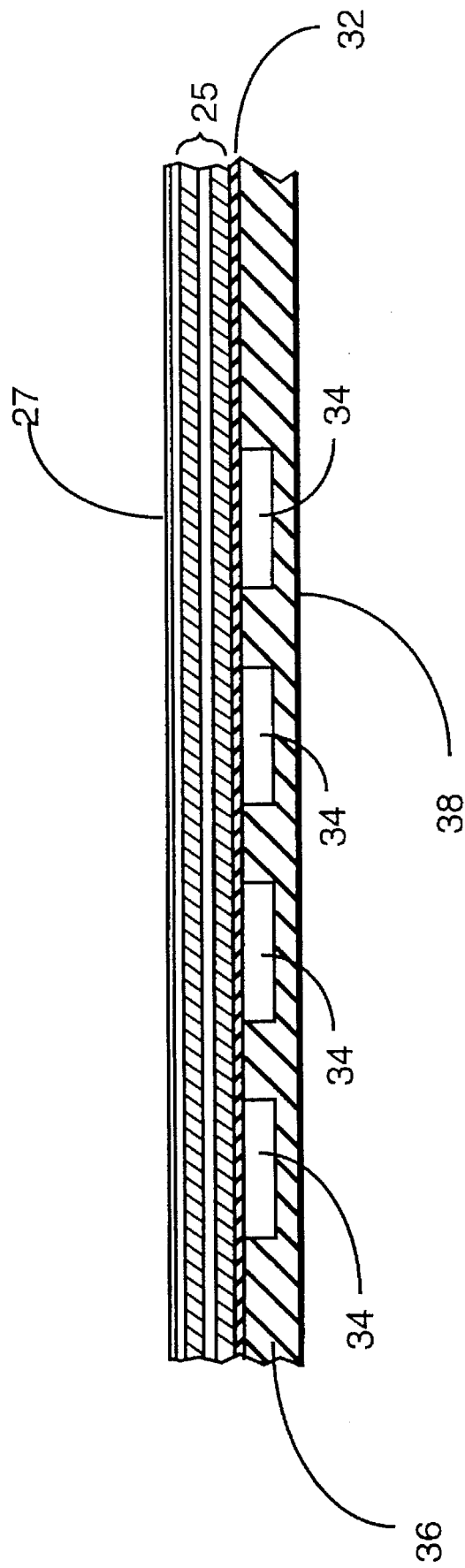
FIG. 2 is a cross-sectional view of the μPDA of FIGS. 1A and 1B.

FIG. 2 is a simplified cross-sectional view of a means for constructing a μPDA according to the present invention in a Type II PCMCIA, or other relatively small package. ICs 34 are encapsulated in a conformal material 36, and interconnection is accomplished by traces on a flexible polymer film 32 shown as overlaying the encapsulated structure. In this structure the ICs are not packaged in the conventional manner having solder leads for assembly to a printed circuit board. Rather, connections are made directly between the solder pads on the chip and the traces on the Kapton film. Also there is no intention to relate ICs indicated by element No. 34 with specific functional ICs in a μPDA. This cross-section is illustrative of a method of construction only.

In this compact construction there may also be traces on the side of film 32 away from the interconnections for the CPU and memory for connection to other elements, such as display 25 and touch-sensitive screen 27.

LCD display 25 is implemented on one side of the μPDA, and touch-sensitive interface 27 is provided overlaying at least a portion of the LCD display. A metal casing 38, or other suitable material or combinations of material, surrounds the internal components and conforms to Type II PCMCIA form factors. This simplified cross-section illustrates some of the principles of construction that can allow the needed components to be inexpensively fitted into the small form factor needed. In another embodiment the μPDA is implemented in the form factor of a type III (10 mm thick) PCMCIA unit, using relatively conventional technology, such as PCB technology, rather than the encapsulated construction described immediately above. Various other constructions, form factors, and combinations are possible, as well.

Figure 3:
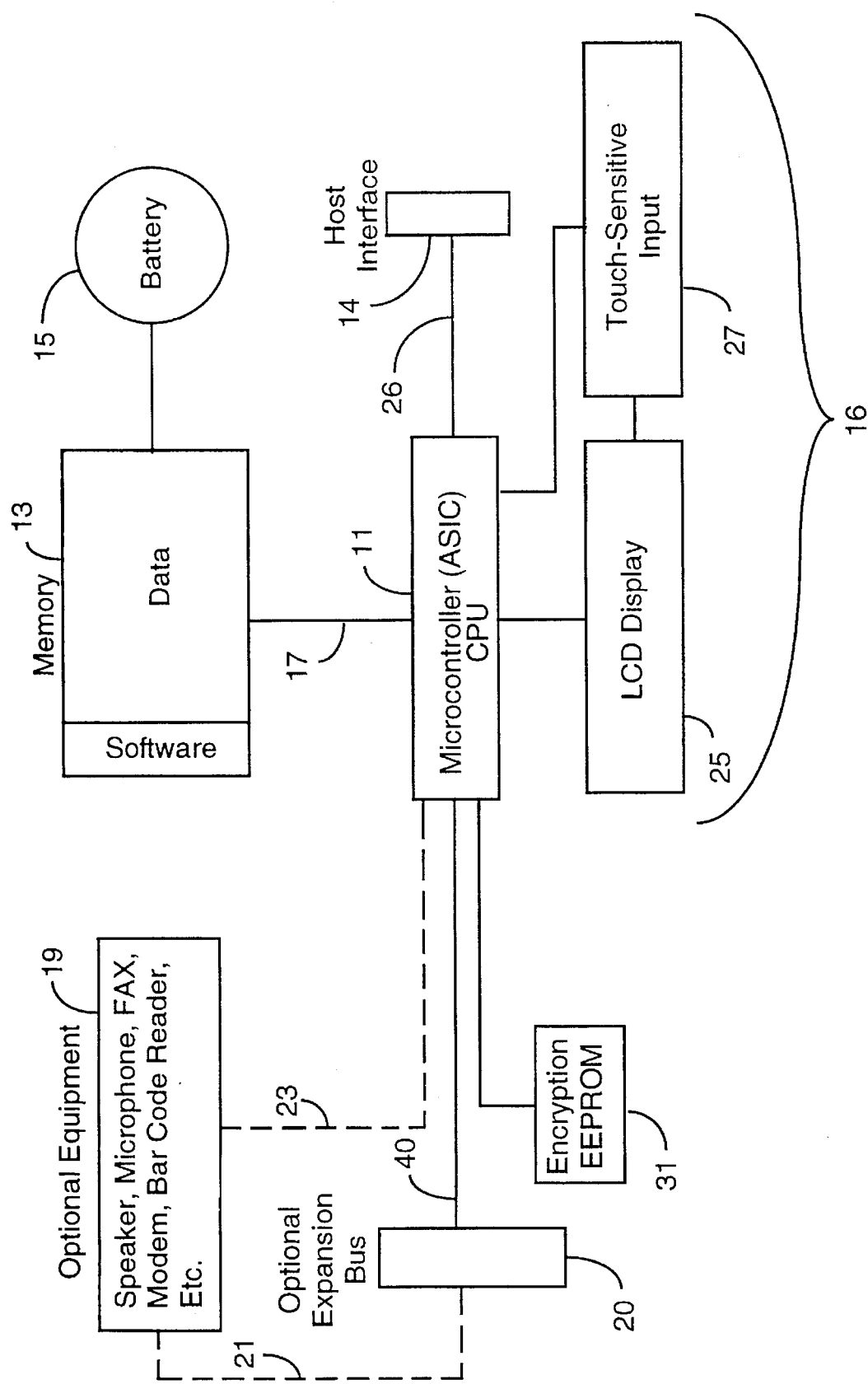
FIG. 3 is a block diagram of the μPDA of FIG. 1A and some peripheral elements.

FIG. 3 is a simplified electrical block diagram of the μPDA of FIGS. 1A, 1B and 2. A unique microcontroller 11 acts as the CPU of the μPDA in the stand-alone mode, that is, when the μPDA is not docked in a host unit. When the μPDA is docked in a host computer, microcontroller 11 acts as a slave unit, granting bus control to the CPU of the host. In docked mode, the CPU of the host thus gains control of the memory contents of the μPDA, subject in most cases to security procedures which are described below. Thus the host computer can transfer data and software into and out of a docked μPDA memory. In other embodiments many other cooperative operating modes may be accomplished between the two CPUs and accessible memory devices.

Memory 13 is preferably a nonvolatile device from 1 to 2 megabytes in this embodiment, and both control routines for applications and data files are stored in this memory. Memory 13 may be flash memory, CMOS ROM, CMOS RAM with battery, or a combination, with the software stored in ROM and the data in the flash memory. The memory device is interfaced to microcontroller 11 via a dedicated bus structure 17, and microprocessor 11 is configured to drive memory bus 17.

A battery 15 is the power source in the stand-alone mode, and may be recharged in one or more of several ways. The power traces are not shown in FIG. 3, but extend to all of the powered devices in the μPDA module. When the unit is docked in the host, the host power source may be connected to pins through the host interface to recharge the battery. Alternatively, an attached means such as a solar panel may be configured to charge the battery and/or provide power to the μPDA. A solar panel for power is described elsewhere in this disclosure. Also the battery may be easily removed for periodic replacement.

Host bus connector 14 is a part of a host interface which comprises a bus structure 26 for providing connection to the host in docked mode, as described above. In a preferred embodiment, the host interface is according to PCMCIA Type II, Rev. 3 standard, which is capable of communication either in PCMCIA mode or in a mode similar to PCI mode. PCI mode refers to a high-speed intermediate bus protocol being developed by Intel corporation, expected to become a standard bus architecture and protocol in the industry. The physical interface at the host in this embodiment is a slot-like docking bay, as is typical of know docking bays for PCMCIA devices. This docking bay may be implemented as a docking box, a built-in unit like a floppy-drive unit, or it may take some other form.

Connector portion 20 is a part of the expansion bus interface described above, comprising a dedicated bus structure 40 connected to microcontroller 11. This interface can be implemented in a number of different ways. The purpose of the optional expansion bus interface is to connect to optional peripheral devices, such as a printer, a FAX modem, a host cellular phone, and others. The expansion bus interface is not an essential feature in a minimum embodiment of the present invention, but provides vastly enhanced functionality in many embodiments.

The expansion interface can take any one of several forms. A preferred form is an extended enhanced parallel port and protocol based on an invention by the present inventors disclosed in a copending patent application. Another form is an indexed I/O port having 8-bit address and 8-bit data capability. The requirement of the expansion port is that the connection and communication protocol be compatible with expansion devices, such as telephone modems, fax modems, scanners, and the like. Many other configurations are possible.

Optional equipment such as devices listed in box 19 may be connected for use with the μPDA through the expansion bus. Selected ones of such devices may also be built in to the μPDA in various embodiments, providing variations of applicability. In the former case, connection is through path 21 and the expansion bus interface via connector portion 20. In the built-in case, connection is in the interconnection traces of the μPDA as indicated by path 23.

I/O interface 16 (also FIG. 1B) is for viewing μPDA application-related data and for touch-sensitive input via softkeys. By softkeys is meant assignment by software of various functions to specific touch sensitive screen areas, which act as input keys. Labels in I/O interface 16 identify functionality of the touch-sensitive areas in various operating modes according to installed machine control routines. LCD display 25 and the touch-sensitive area 27 together form the combination I/O interface 16 described also above.

In some embodiments of the present invention, data and program security is provided comprising an Electrically Erasable Programmable Read Only Memory (EEPROM) 31, which is connected by dedicated communication lines to microcontroller 11. EEPROM 31 holds one or more codes installed at the point of manufacturing to provide security for information transfer between a host and a μPDA. The purpose is to control access by a host to the memory contents of a μPDA, so each μPDA may be configured to an individual. To accomplish this, docking and bus mastering machine control routines are initiated at the point of docking, and this security process is described in more detail below. In other embodiments, security codes may be provided by a Read Only Memory (ROM) chip or other permanent or semi-permanent memory source.

Figure 4:
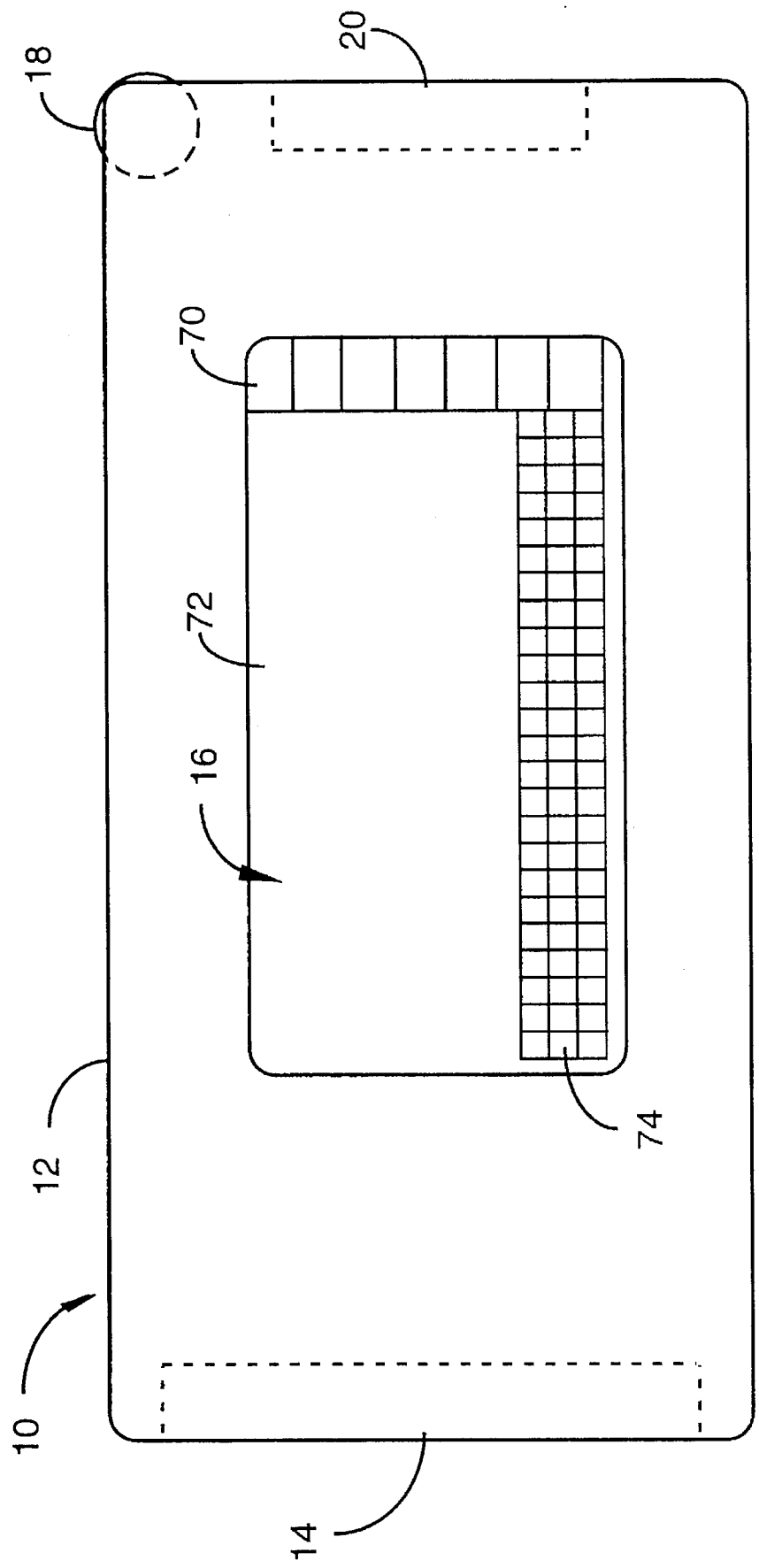
FIG. 4 is a more detailed plan view of the μPDA of FIG. 1A showing in particular an LCD display and touch screen user interface in an aspect of the present invention.

FIG. 4 is a plan view similar to FIG. 1B, of a μPDA, showing in particular I/O interface 16. The size and location of I/O interface 16 may vary, but in general occupies a major portion of one of the sides of the module. In one embodiment I/O interface 16 comprises an LCD display with a resolution of 256 by 144 pixels in a screen size that displays 32 by 12 characters. Each character in this embodiment is displayed in an area eight pixels wide and twelve pixels high. In another embodiment, the pixel resolution is 320 by 200, which corresponds to 40 by 16 characters.

The touch-sensitive areas of the touch-sensitive screen correspond to the character areas of the display. By touching an area with a finger or stylus, data can be entered quite quickly and with minimal CPU demand.

At one corner, thumbwheel 18 provides a two-directional means of controlling the configuration of the display according to installed control routines. A menu 70 is configured at one side to represent the current status of any application in progress and to provide appropriate user menu selections. In a preferred embodiment input from thumbwheel 18 is used for scrolling through menu 70, and active areas may be indicated by a cursor. A user makes a menu selection by pressing the appropriate touch-sensitive area. A specific input may be provided to cause the menu area to be displayed on either side of the display according to a user's preference.

Specific characters are displayed in this embodiment in a region 74, with each character area associated with a touch-sensitive input area. As region 70 dedicated to selectable characters is much too small to display all characters of a standard keyboard, input from thumbwheel 18 allows a user to pan region 74 displaying an entire virtual standard keyboard. Movement of thumbwheel 18 in one direction pans the character region horizontally, and movement in the other direction pans the character region vertically. When an end is reached the window pans onto the virtual keyboard from the other end. In this manner, a user may quickly pan the character window to display an entire standard keyboard, and make selections with a finger or a stylus. Of course, it is not required that a virtual keyboard be laid out for access in the format of a standard keyboard. Characters and punctuation, etc., could just as simply be displayed in a single strip along a region of the display, and scrolled by input from the thumbwheel or other pointer-type input device.

In this embodiment, to avoid delays caused by panning, if the thumbwheel is rotated quickly the character window jumps rather than scrolling to speed up the interface. In addition, menu 70 may optionally provide for a character display in different fonts and sizes, although a single font is preferred to minimize memory demand. It will be apparent to those with skill in the art that there are many alternatives for character selection and display, and many ways thumbwheel 18 may be configured to allow for scrolling and panning.

A document window 72 is provided in this embodiment at the top or bottom of I/O interface 16. A cursor locates the active position within the document for editing purposes. Menu 70 provides selection of available fonts, and input by thumbwheel 18 controls cursor movement over the document. As a document will in almost all cases be much larger than the display capability of region 72, it is necessary to pan the document window in essentially the same manner as the keyboard window is panned. For example, rotating thumbwheel 18 in one direction may display horizontal strips of a document, while rotating the thumbwheel in the opposite direction moves the window vertically strips of the same document.

A soft key or optional hard key may be configured to switch between the document and keyboard window, and the same or another key may be configured to switch between scrolling left or right, up or down, document or keyboard. A switch key may be used to change the thumbwheel mode of operation. A switch key may also be used in combination with a floating pointer to select characters and menu items. In this embodiment, the user can keep his or her hands relatively stationary on just the thumbwheel and the switch key, making all possible selections. Use of a a switch key in combination with a floating pointer facilitates the use of small fonts. A switch key may also be incorporated as an additional hard key in a convenient location on the case 12.

It will be obvious to a person skilled in the art than there are numerous ways to combine menu selections, switching keys and I/O configurations to provide a user-friendly user interface. A further embodiment of the present invention provides an I/O set-up application wherein a user may completely customize features of I/O area displays.

There are other sorts of mechanical interfaces which may be used to provide pointer-style input in different embodiments of the invention as alternatives to the thumbwheel disclosed. One is a four-way force-sensitive mouse button and a selector button, which may be located at opposite ends of case 12 below I/O interface 16. Each button is designed to be operated by one finger. The four-way force-sensitive mouse button can provide menu scrolling of a cursor and panning and/or indexing of keyboard and document windows, while the selector button is used to select and edit according to position of a cursor. This configuration minimizes hand movement and keeps the I/O area clear for viewing.

Implementation of thumbwheels, pressure-sensitive switches and buttons, and the like, are known in the art, including the translation of mechanical motion and pressure to electrical signals and provision of such signals to a microcontroller. For this reason, details of such interfaces are not provided in this disclosure. Combinations of such inputs with displays and input areas may, however, be considered as inventive.

Figure 5:
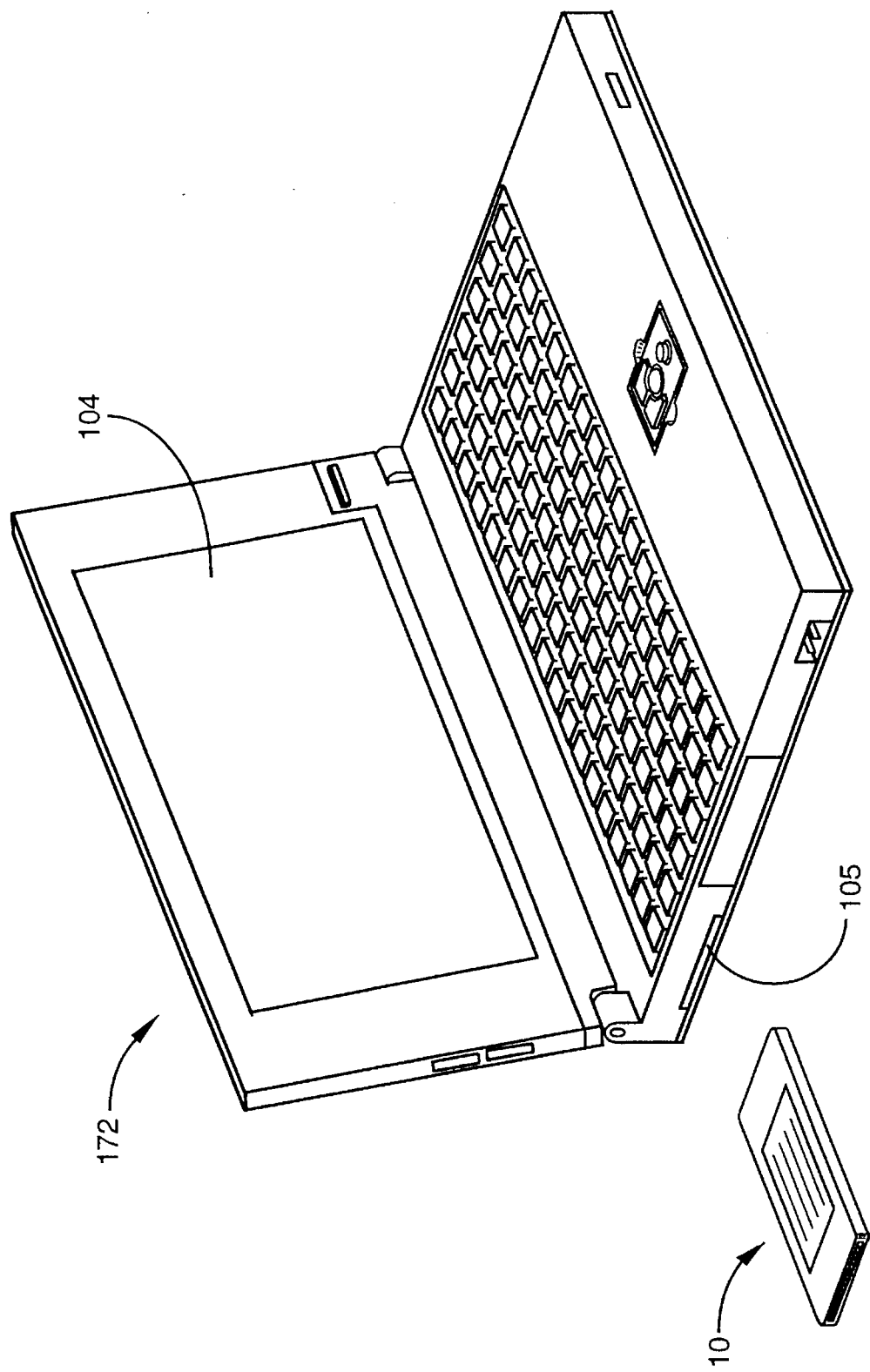
FIG. 5 is an isometric view of a μPDA and a host notebook computer in an aspect of the present invention, with the μPDA about to be docked in a docking bay of the notebook computer.

FIG. 5 is an isometric drawing of a μPDA 10 in position to be docked in a notebook computer 172 via a Type II PCMCIA docking port 105 according to an embodiment of the present invention. As further described below, once the μPDA is docked, it is activated and a procedure is initiated with the host computer to manage communication and verify memory access rights (security).

Access rights are considered important by the inventors for a number of reasons. Firstly, through the expedient of one or more specific codes, unique to each μPDA, a user may protect files stored in his module from access by unauthorized persons. The code can be used both to control access to data and files via I/O interface 16, and also through the host bus interface, so data and files may be secure from access by an unauthorized host system.

In the former case, when a μPDA is powered up, an application routine can query the user for an access code to be entered at I/O interface 16 FIG. 4). If the code is not entered properly, access is denied, and power goes off. Codes for the purpose are stored in EEPROM 31 (FIG. 3), or in whatever ROM device may be devoted to the purpose. In some embodiments, the code may by mask-programmed at manufacture, so it is not alterable. In others, the code may be accessible and changeable by special procedures in the field.

In the case of host communication, it is possible that a portable or desktop computer, or some other device, may have a docking port physically configured to receive a μPDA, yet not be configured to communicate with the μPDA. This certainly might be the case where the μPDA is in the PCMCIA form. For purposes of disclosure and description, this specification terms such a unit a generic host. If the unit is configured to communicate with a μPDA it is an enabled host. If a host is configured for full access to a particular μPDA, it is a dedicated host.

If a docking unit is a generic host, there will be no communication unless the person presenting the μPDA provides the control routines to the host. This may be done for a generic host such as by transfer from a floppy disk, from a separate memory card through the docking port, or, in some embodiments, the communication software may be resident in memory 13 (FIG. 3) of a docked μPDA, transferrable to the host to facilitate further communication.

If the docking unit is in fact an enabled host, or is configured after docking to be an enabled host, the stored code or codes in EEPROM 31 (or other storage unit) may be used to verify authorization for data and program transfer between the host and a μPDA. In one embodiment this procedure is in the following order: First, when one docks a μPDA in a compatible docking port, certain pin connections convey to both the μPDA microcontroller and to the host CPU that the module is docked. Assuming an enabled host, the fact of docking commences an initialization protocol on both systems.

In most embodiments, if the docking unit is a non-host, that is, it is not capable of communication with the docked module, nothing happens, and the user may simply eject the docked module. If the computer is an enabled host, an application is started to configure host access to the μPDA's data files through the μPDA microcontroller. A user interface, described more fully below for a particular embodiment, is displayed on the host monitor 104 (FIG. 5). The host interface menu, as well as other application menus, may be formatted in part as a display of the μPDA I/O interface 16 as seen in FIG. 4 and described in accompanying text. In some embodiments, the docked μPDA can be operated in situ by manipulating the input areas of the μPDA displayed on the host's screen.

If the host is not a home unit for the docked module, that is, the host does not have matching embedded ID codes to those stored in the docked module, a visitor protocol is initiated. In this event, a visitor menu is displayed on host display 104 for further input, such as password queries for selections of limited data access areas in the docked module. In this case, too, a user may gain full access to the docked module's memory registers by entering the proper password(s).

If the host is a fully compatible host home unit, full access may be immediately granted to the host to access memory contents of the docked module, including program areas; and both data and programs may be exchanged.

In any case, when the μPDA is ejected or otherwise removed from the docking port, the on-board module microcontroller again gains full control of the internal μPDA bus structures.

Figure 6:
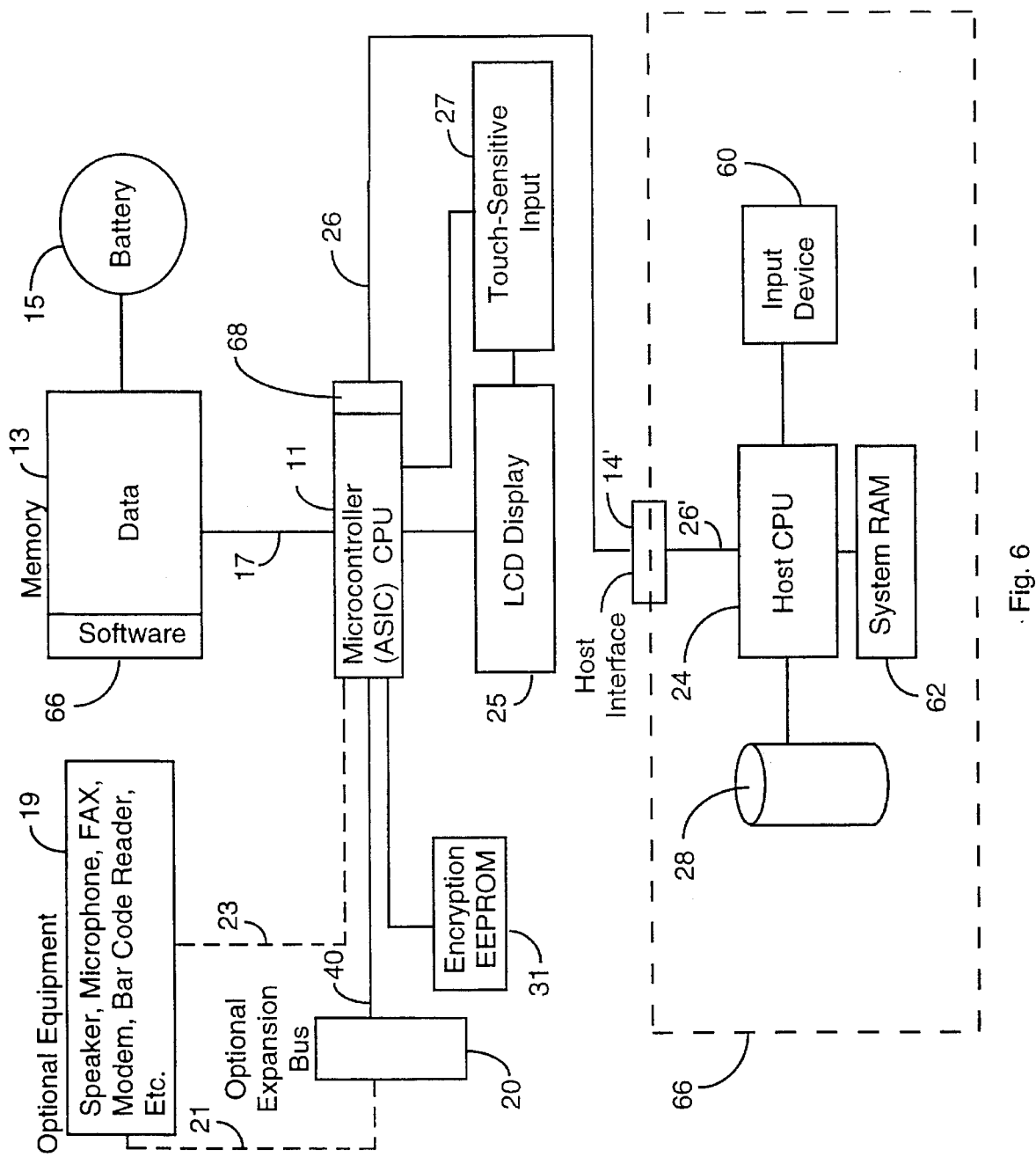
FIG. 6 is a block diagram of a μPDA docked in a docking bay of a host computer according to an embodiment of the present invention.
Figure 7:
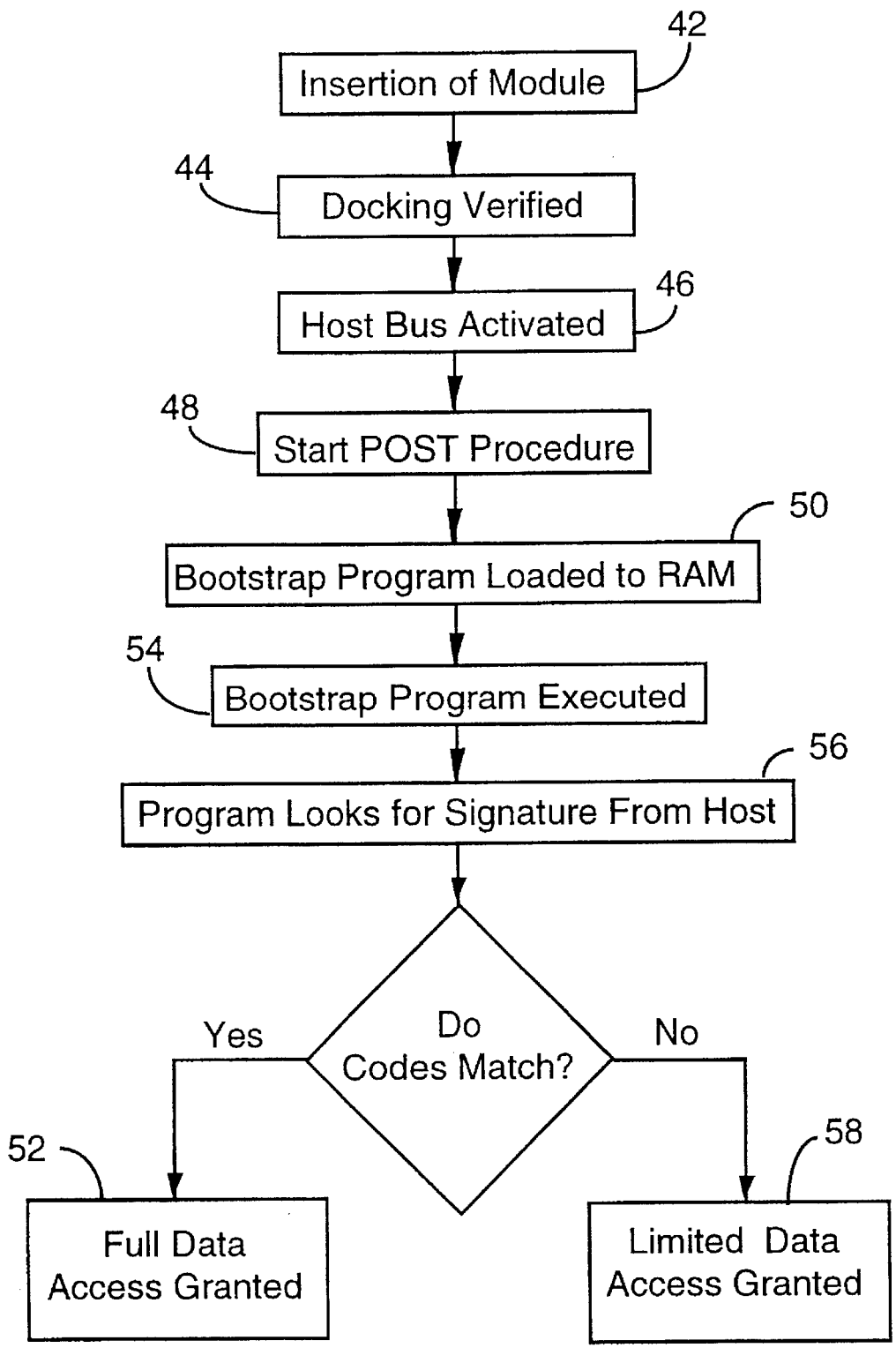
FIG. 7 is a logic flow diagram of the steps in docking a μPDA in a host computer according to an embodiment of the present invention.

FIG. 6 is a simplified block diagram of a μPDA docked in a host computer, and FIG. 7 is a basic logic flow diagram of the steps involved in docking a μPDA in a host computer 66 according to an embodiment of the present invention. Host computer 66 is represented in a mostly generic form, having a host CPU 24, and input device 60, such as a keyboard, a mass storage device 28, such as a hard disk drive, and system RAM 62. It will be apparent to those with skill in the art that many hosts may have a much more sophisticated architecture, and the architecture shown is meant to be illustrative.

When a μPDA unit is docked, connector 14' in FIG. 6 comprises portion 14 shown in FIGS. 1B and 3 and a mating connector portion for engaging portion 14 in port 105 (FIG. 5). The engagement of the separate portions of the connector cause bus 26 in the μPDA and bus 26' in the host to become directly connected. There is then a direct bus path between microcontroller 11 and host CPU 24 (FIG. 6).

As previously described there is a pin configuration (not shown) in connector 14 dedicated to signalling that a module is docked. In FIG. 7, step 42 represents insertion of a μPDA module into the docking port. At step 44 the signalling pin configuration signifies physical docking is accomplished. At step 46 host interface bus 26 is activated, including the mated host bus 26' in the host.

At step 48 (FIG. 7) microcontroller 11 in the μPDA starts a preprogrammed POST procedure. Microcontroller 11 in this embodiment has a page of RAM 68 implemented on the microcontroller chip. In other embodiments RAM may be used at other locations. At step 50, the POST routine loads a bootstrap program to RAM 68, which includes a code or codes for security matching. This code or codes comprise, for example, a serial number.

At step 54 the bootstrap program begins to execute in microcontroller 11, and at step 56 the microcontroller looks for a password from the host on host interface bus 26 (FIG. 6).

The fact of docking, assuming an enabled or dedicated host, also causes a communication routine, which may be accessed from, for example, mass storage device 28 at the host, to display a user interface on monitor screen 104 of the host unit, as partly described above. It is this communication program that makes a generic host an enabled host.

Assuming an enabled, but not dedicated, host, the user interface will query a user for input of one or more passwords, after successful entry of which the host will pass the input to microcontroller 11 for comparison with the serial number and perhaps other codes accessed from EEPROM 31 in the bootstrap of the μPDA.

According to the codes passed from the host to the docked module, microcontroller 11 will allow full access to memory 31 at function 52, FIG. 7, for the host CPU, or limited access at some level at function 58, defined by received codes (or no matching code at all).

The access protocols and procedures allowing partial or direct access to μPDA memory 13 are relatively well known procedures in the art, such as bus mastering techniques, and need not be reproduced in detail here. In addition to simple comparison of codes, there are other techniques that may be incorporated to improve the integrity of security in the communication between a μPDA and a host. For example, within the limitation of storage capacity of the EEPROM or other nonvolatile source, executable code might also be uploaded to onboard RAM 68, or code keys to be used with executable code from other sources, or relatively simple maps re-allocating memory positions and the like, so each μPDA may be a truly unique device.

There are additional unique features provided in one aspect of the invention as part of the communication routines introduced above. One such feature is automatic updating and cross-referencing of existing files and new files in both computers, under control of the host system, with the host having direct bus access to all memory systems. Auto-updating has various options, such as auto-updating by clock signature only, flagging new files before transfer, and an editing means that allows the user to review both older and newer versions of files before discarding the older in favor of the newer. This automatic or semiautomatic updating of files between the satellite and the host addresses a long-standing problem. The updating routines may also incorporate a backup option to save older files.

Another useful feature in host/μPDA communication is a means for a user to select and compose a mix of executable program files for downloading to a μPDA, either replacing or supplementing those executable routines already resident. A user can have several different program lists for downloading as a batch, conveniently configuring the applicability of a μPDA among a wide variety of expected work environments.

Such applications as databases, spreadsheets, documents, travel files such as currency converters, faxing and other communications programs, time clocks, address and telephone records, and the like, may comprise customized lists of user-preferred applications.

In another embodiment, an undocked μPDA can transfer data via the optional expansion bus 40 (FIG. 3) directly to a host. In the special case of a μPDA user without access to a PCMCIA interface on his host (notebook or desk-top) computer, he or she can connect to a host via an auxiliary port on the host, such as a serial port, via the expansion bus interface. In this case, the μPDA still requests password(s) from the host, and controls access to its on-board memory according to the password(s) received.

The optional expansion interface may also be used in some embodiments while a μPDA is mastered by a host, wherein the host may effectively send data through the bus structures of the μPDA.

ADDITIONAL ASPECTS AND FEATURES

Software Vending Machine

In a further aspect of the invention, a Software Vending Machine with a very large electronic storage capacity is provided, wherein a μPDA user may dock a module and purchase and download software routines compatible with the μPDA environment.

Figure 8:
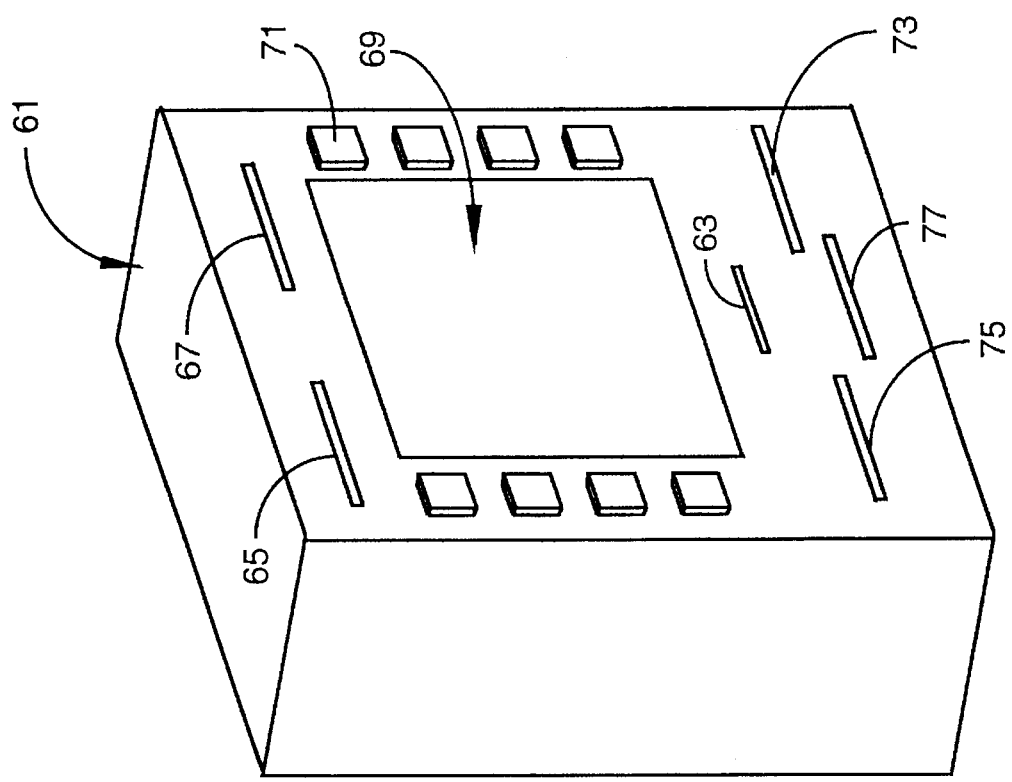
FIG. 8 is an isometric illustration of a μPDA software vending machine in an aspect of the present invention.

FIG. 8 is an isometric view of such a vending machine 61 having a docking bay 63 for a μPDA, a credit card slot 65, and a paper money slot 67. A display 69 provides a user interface for reviewing and purchasing software from the vending machine, along with selector buttons such as button 71 along the sides of the display. In an alternative embodiment the display may also have a touch screen, and may, in some embodiments, emulate the μPDA I/O area on a larger scale.

In operation, a user may, in this embodiment, review software for sale simply by docking his μPDA unit in the vending machine and selecting from a menu on display 69. The menu may allow the user to browse all available applications, or list new applications since entered dates. The user can select certain applications, try them out, at least in simulation, and then select applications to purchase.

The vending machine, once all the requirements are met, such as proper identification and payment, copies the selected application(s) to the memory of the μPDA, or, alternatively, to a floppy disk provided by either the user or the vending machine. In this case there is also a floppy disk drive 73 in the vending machine and a port 75 for dispensing formatted floppies for a customer to use in the disk drive. This mode is useful for the instances where a user's μPDA is loaded beyond capacity to receive the desired software, or the user simply wishes to configure the software mix himself from his or her own host computer.

There may also be provided a backup option so a user may instruct the vending machine to read and copy all or a selection of his files to one or more floppy disks before installing new files or data.

As described above, each user's μPDA includes an EEPROM or other storage uniquely identifying the μPDA by a serial number or other code(s), so the vending machine may be configured in this embodiment to provide the software in one of several modes.

A user may buy for a very nominal price a demo copy of an application, which does not provide full capability of the application, but will give the user an opportunity to test and become familiar with an application before purchase. Also, the user may buy a version of the same application, configured to the ID key of the μPDA to which it is loaded, and operable only on that μPDA. In another embodiment, the software is transferable between a family of keyed μPDAs, or has the ability to "unlock" only a limited number of times. In these cases, the applications would be sold at a lesser price than an unlocked version. The unlocked version works on any μ-PDA and/or host/μPDA system. The higher price for the unlocked version compensates for the likelihood of unauthorized sharing of the rended applications.

The vending machine could also offer a keyed version, customized to operate only on the μPDA docked in the software vending machine, or upon a family of μPDAs. This keyed version is possible because of the individual and unique nature of each μPDA, which has, at a minimum, a unique serial number, and may also have other security programming, as described above, which allows a vending machine to prepare and download a customized copy of an application that will operate only on the particular module for which it is purchased.

There are a number of different means by which unique correspondence might be accomplished, as will be apparent to those with skill in the art. A standard version stored in the memory facility of a vending machine might be recompiled, for example, on downloading, using a unique code from the docked or identified μPDA as a key in the compilation, so only the specific μPDA may run the program by using the same unique key to sequence the instructions while running. The key for scrambling or otherwise customizing an application might also comprise other codes and/or executable code sequences stored uniquely in a μPDA.

In yet another aspect related to the vending machine, there is a printer outlet 77 which prints a hardcopy manual for the user. It is, of course, not necessary that the software vended be specific to the M-PDA. Applications may also be vended for other kinds of machines, and transported in the memory of the μPDA, or by floppy disk, etc. In this embodiment a non-μPDA user can acquire a wide assortment of software.

The software vending machine may also serve as an optional informational display center in such locations as airports, train stations, convention centers, and hotels. Upon inserting a μPDA a user may interface directly and upload current information including, but not limited to, local, national, and world news; stock quotes and financial reports; weather; transportation schedules; road maps; language translators; currency exchange applications; E-mail and other direct on-line services.

A customized vending machine could be tailored to business travelers and allow fast access to pertinent information, allowing the user to download files to send via E-mail. In another aspect of the invention, the vending machines are linked to each other allowing users to send messages to associates travelling through locations of associated vending machines. Such dedicated μPDA E-mail is immediately downloaded to a specific μPDA as it is docked. The sender may have the associate's μPDA unique encoded key as identification, or some other dedicated identifying means for E-mail.

In another embodiment, as each business associate arrives at an airport, he or she may prompt the custom vending machine in that location via an optional installed infrared interface (not shown) in their μPDA. The custom vending machine, also equipped for infrared communication, receives the signal and sends/or receives any messages that are waiting.

Enhanced Display

Figure 9:
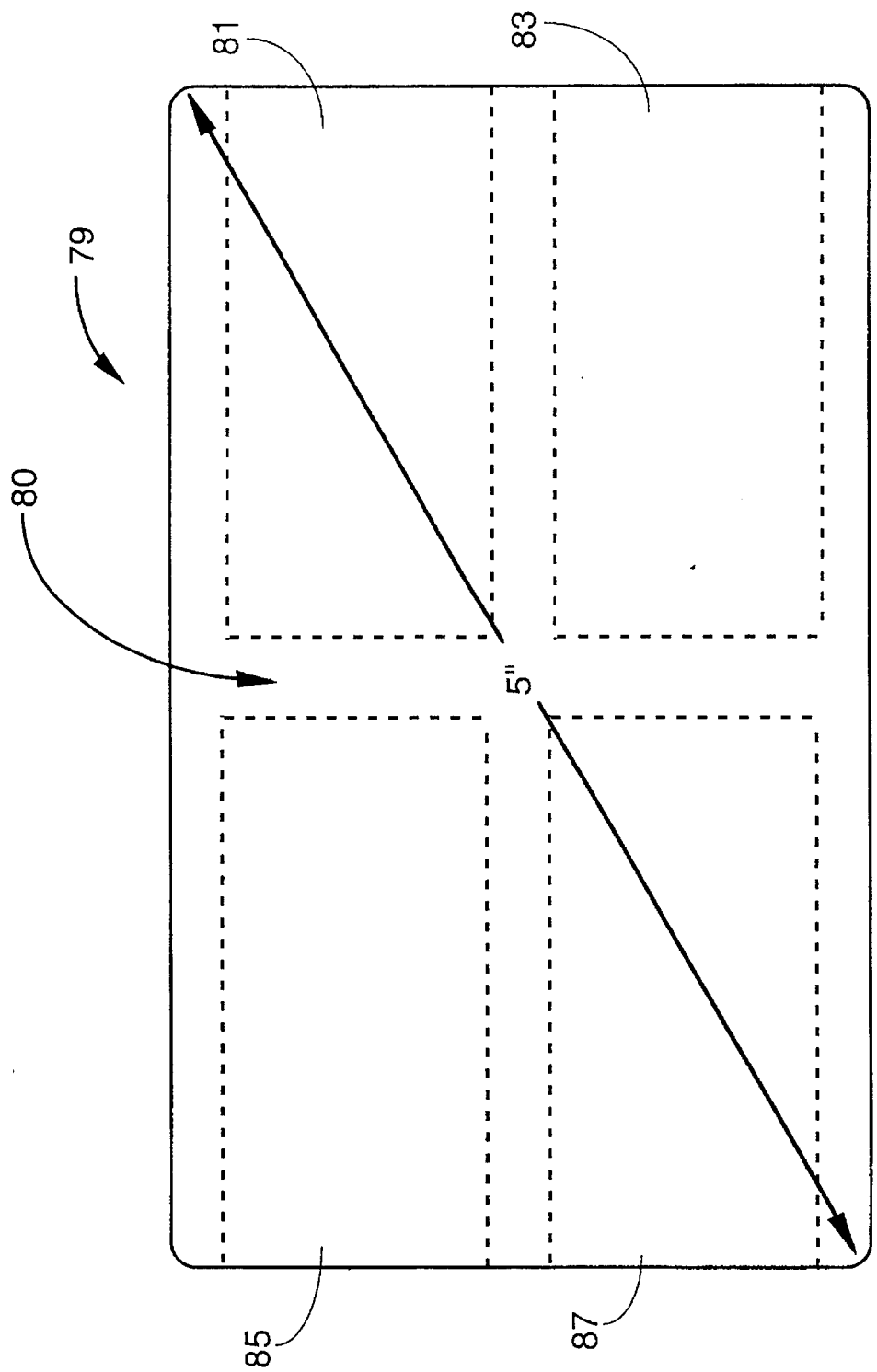
FIG. 9 is a top plan view of a μPDA enhanced user interface according to an embodiment of the present invention.

FIG. 9 is a plan view of an enhanced I/O interface unit 79 according to an aspect of the present invention. Interface unit 79, with about a 5-inch diagonal measurement, comprises a combination LCD display at least partially overlaid by a touch-sensitive input screen, providing an I/O area 80 in much the same manner as in a μPDA. Four docking bays 81, 83, 85, and 87 are provided in the left and right edges of interface unit 79 in this embodiment, and are configured for PCMCIA type II modules. One of these bays may be used for docking a μPDA according to the present invention, and the other three to provide a larger CPU, additional memory, battery power, peripheral devices such as modems, and the like by docking functional PCMCIA modules.

Interface unit 79 is a framework for assembling a specialty computer through docking PCMCIA units, including a μPDA according to the present invention. In other embodiments where the μPDA assumes other form factors, the docking bays may be configured accordingly.

A docked μPDA in this embodiment is configured to produce its I/O display on I/O area 80. The thumbwheel on the M-PDA is accessible while docked and acts as described above in the stand-alone mode in this case. In another aspect, the enhanced display has a re-configured output that enables the user to manipulate the data from the touch-screen alone and/or additional hardware selector buttons and/or a standard keyboard attached to the enhanced display via a dedicated bus port, or even through the expansion port of a docked μPDA. In a further embodiment the enhanced display has a dedicated mouse port and/or a dedicated thumbwheel.

In yet another embodiment, interface unit 79 has an inexpensive, conventional, replaceable battery and/or a rechargeable battery. Also, in another aspect, interface unit 79 may dock two or more individual μPDAs and cross-reference data files between them according to control routines that can manipulate mutually unlocked files. Further still, interface unit 79 may be placed and structurally supported for easy viewing on a dedicated standard or smaller-sized keyboard, connecting to the keyboard as an input device. The keyboard would then automatically serve as the input device.

Interface unit 79 for a μPDA is small and compact enough to slip into a pocket book or briefcase, providing a very portable, yet very powerful, computer.

Microphone/Voicenotes

Figure 10:
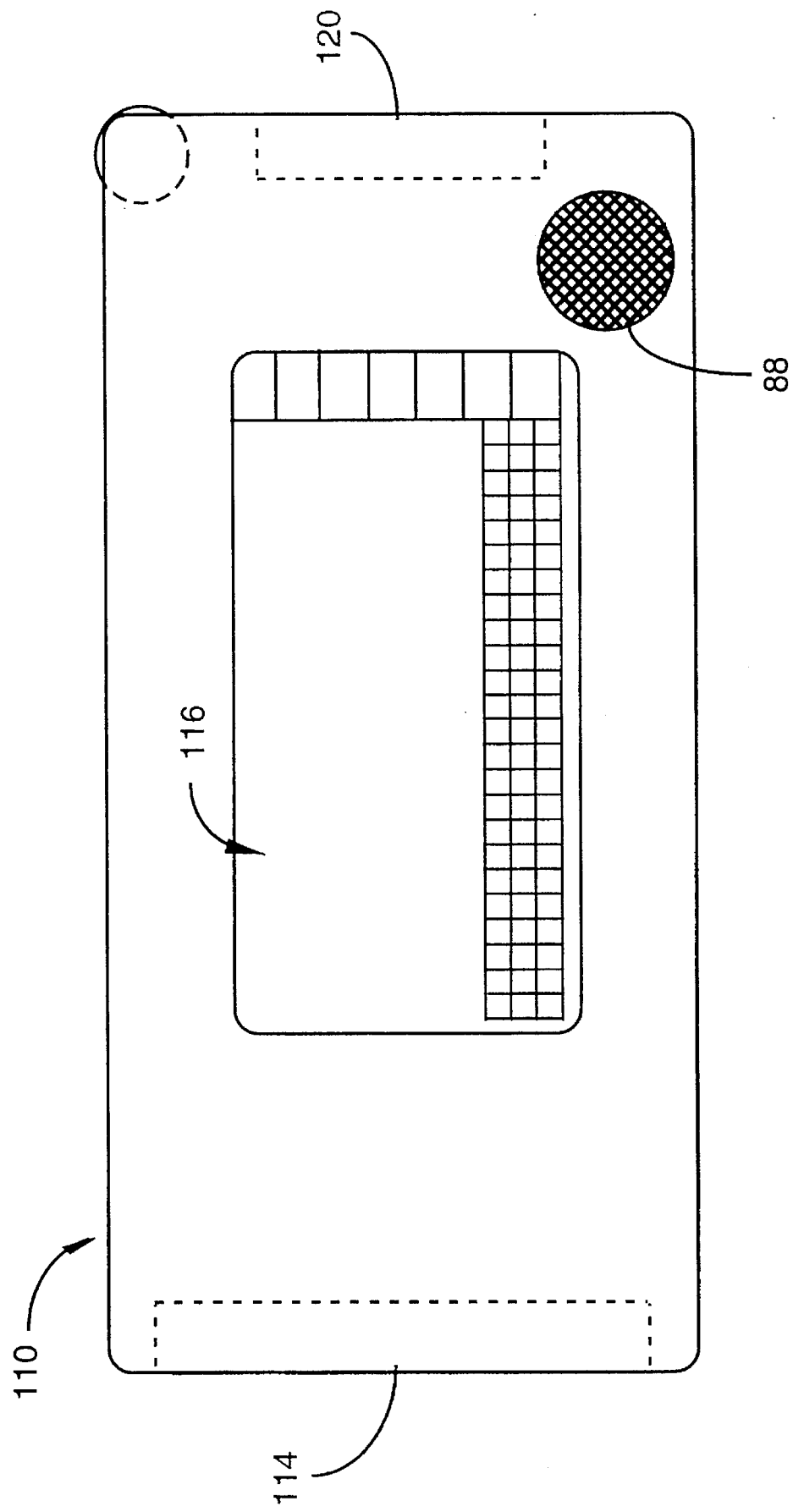
FIG. 10 is a top plan view of a μPDA with a microphone in an embodiment of the present invention.

FIG. 10 is a plan view of a μPDA 110 with an I/O interface 116, an expansion port 120, and a host interface connector 114. μPDA 110 has all the features previously described and additionally a microphone 88. In this embodiment, control routines in the μPDA use a linear pedictive coding (LPC) approach to convert analog input from the microphone to a digital voice recording. This approach uses a minimum of memory, but still is capable of reproducing audio input like the human voice within recognizable limits.

In an alternative embodiment, for better quality voice recording, a two-step integrator may be used in order to separate the analog signal and synthesize a closer digital representation.

With a μPDA so configured, a user's voice notes can be recorded and later uploaded to a host for processing. In future embodiments the digital signals may be converted to text or sent as voicemail on a network. In yet another embodiment, the microphone is integrated with a speaker for editing purposes.

Cellular Telephone Interface

Figure 11:
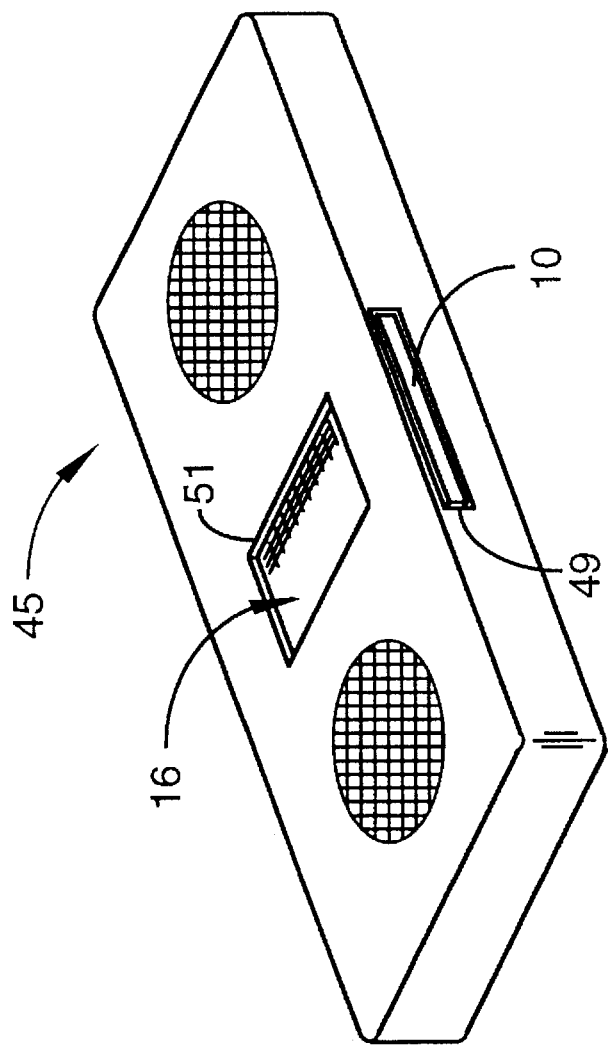
FIG. 11 is an isometric drawing of a μPDA docked in a dedicated cellular or cordless telephone according to an embodiment of the present invention.

FIG. 11 is an isometric view of a μPDA 10 docked in a dedicated cellular telephone 45 according to an embodiment of the present invention. Telephone 45 has a docking port 49 for a μPDA according to the invention. In this embodiment, port 49 is on one side of telephone 45, and there is a window 51 to provide access to I/O interface 16 of the μPDA after it is docked. With the μPDA docked, all of the software and memory of the μPDA is available to the telephone and a user may operate the phone by I/O interface 16.

In this aspect of the invention, unique control routines and display configurations are provided to enhance use of the cellular phone. For example, all of the user's collection of phone numbers, associated credit card numbers, access codes, etc. are readily available and may be quickly and conveniently accessed and used. In one aspect, a simple input displays alphabet letters to select, and once a letter is selected, a partial list of parties that might be called is displayed. One may scroll through the list by touch input or by use of the thumbwheel of the μPDA and select a highlighted entry. It is not required that the telephone numbers be displayed.

Once a party to be called is selected, the μPDA dials the call, including necessary credit card information stored in the memory of the μPDA for this purpose.

In a further embodiment, the calls are timed and timestamped and a comprehensive log, with areas for notes during and after, is recorded.

In another embodiment, conversations are digitally recorded and filed for processing later. A future embodiment may include a voice compression program at a host or within cellular phone 45. Compressed voice files, such as, for example, messages to be distributed in a voicemail system, may be downloaded into the μPDA or carried in a larger memory format inside the cellular telephone. The μPDA can then send the files via a host or dedicated modem attached at connector portion 20 to the optional expansion bus 40 (FIG. 6).

The cellular telephone may, in this particular embodiment, have a bus port for digital transmission. In this case, the compression algorithm along with voice system control routines are also established at the receiving end of the transmission to uncompress the signal and distribute individual messages.

In a further embodiment, voice messages may be sent in a wireless format from the cellular telephone in uncompressed digital synthesized form, distributing them automatically to dedicated receiving hosts, or semi-automatically by manually prompting individual voicemail systems before each individual message. In a further aspect of wireless transmission, a microphone/voicenote μPDA as in FIG. 10 may send previously stored voicenotes after docking in a cellular telephone interface.

In Europe and Asia a phone system is in use known as CT2, operating on a digital standard and comprising local substations where a party with a compatible cellular phone may access the station simply by being within the active area of the substation. In one aspect of the present invention, a CT2 telephone is provided with a docking bay for a μPDA, and configured to work with the μPDA. In yet another aspect of the invention, in the CT2 telephone system, and applicable to other digital telephone systems, a compression utility as disclosed above is provided to digitally compress messages before transmission on the CT2 telephone system.

It is roughly estimated that a dedicated compression algorithm may compress ten minutes of voice messages into one minute using the existing CT2 technology. This would save on telephone use charges significantly. In this aspect, there needs be a compatible decompression facility at the receiving station, preferably incorporated into a standard μPDA voicemail system for CT2 or other digital transmissions.

In a further embodiment, control routines are provided to enable the microphone/voicenote μPDA as illustrated in FIG. 10 to carry digital voicenotes, either compressed or uncompressed. When docked in a CT2-compatible μPDA cellular telephone, the μPDA in this embodiment can transmit the digital voicenotes in compressed form.

Speaker/Pager

Figure 12:
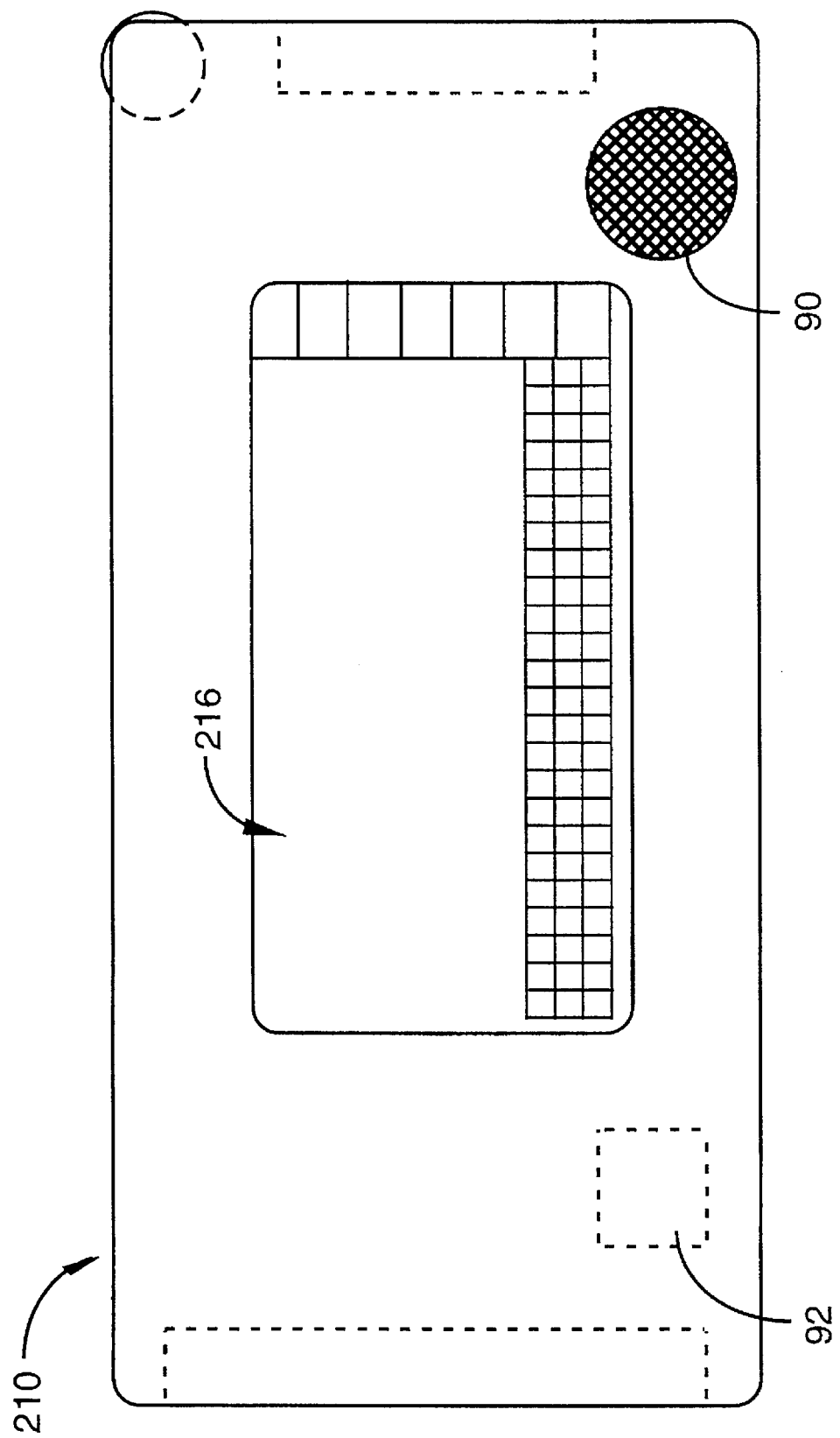
FIG. 12 is a plan view of a μPDA with a speaker and pager interface according to an embodiment of the present invention.

FIG. 12 is a plan view of a μPDA 210 with a microphone/ speaker area 90 and a pager interface 92 according to an embodiment of the present invention. This μPDA has the ability to act as a standard pager, picking up pager signals with installed pager interface 92 and alerting a user through microphone/speaker 90. Once the signals are received, μPDA 210 can be docked in a compatible cellular telephone as illustrated in FIG. 11 and the μPDA will automatically dial the caller's telephone number. All other aspects are as described in the docked mode in the cellular telephone.

In another embodiment, the speaker/pager μPDA can be prompted to generate DTMF tones. The DTMF tones are generated from a caller's telephone number.

The speaker/pager μPDA can store pager requests in its onboard memory. It can also display all pager requests including time and date stamps, identification of the caller, if known, and other related information, on I/O interface 216. In this particular embodiment, a user can receive a page, respond immediately in digital voicenotes on the μPDA via speaker/microphone 90, and then send the response from a dedicated μPDA-compatible cellular telephone or conventional telephone.

Wireless Infrared Interface

Figure 13:
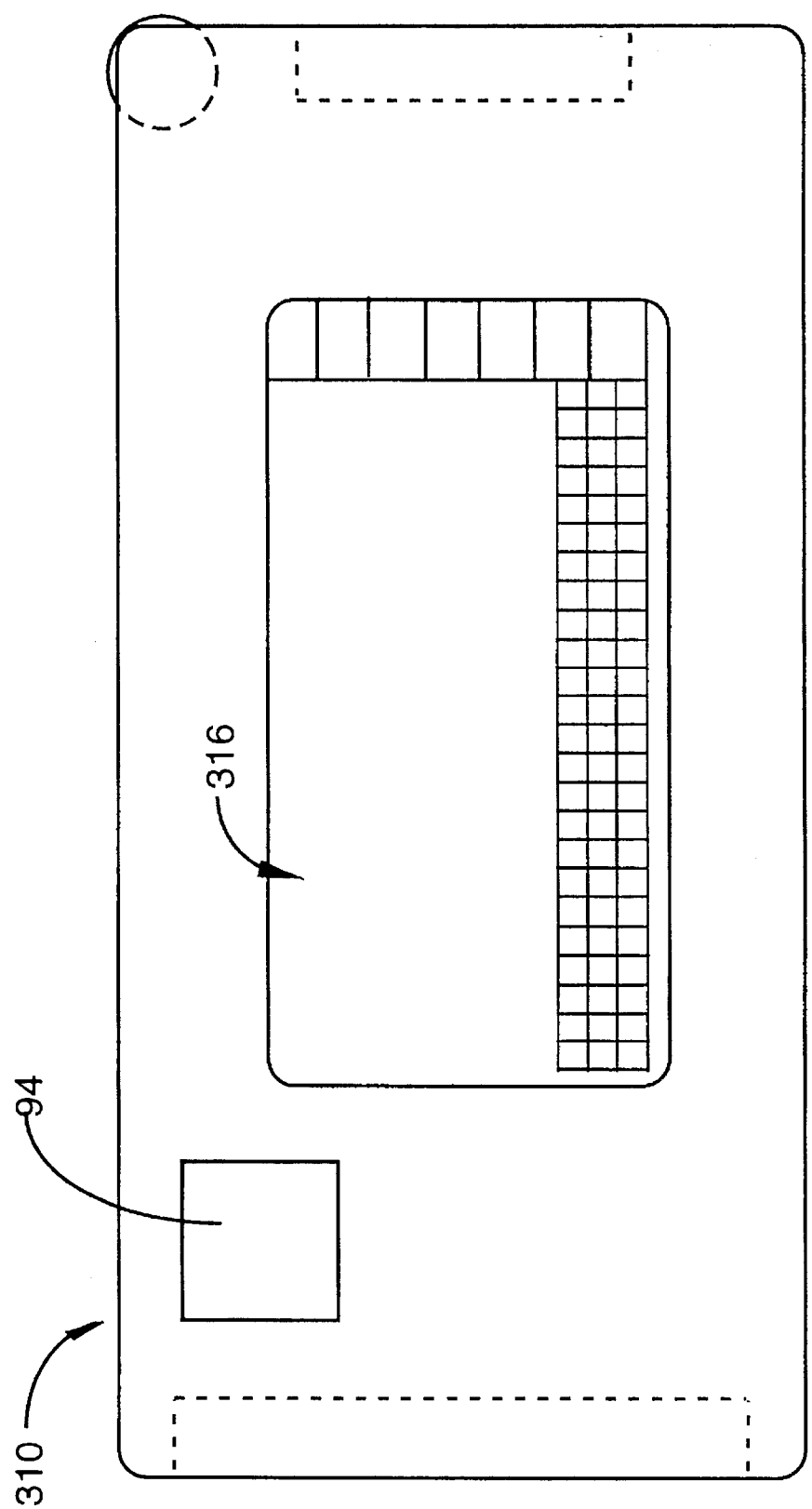
FIG. 13 is a plan view of a μPDA with an infrared communication interface according to an embodiment of the present invention.

FIG. 13 is a plan view of a μPDA 310 with an IR interface 94 according to an embodiment of the present invention. In this embodiment the μPDA may communicate with an array of conventional appliances in the home or office for providing remote control. Unique signals for the appliances are programmed into the μPDA in a learning/receive mode, and filed with user password protection. Once a correct password in entered, an icon-based menu is displayed on I/O area 316 in a user-friendly format. A master routine first queries a user for which device to access. For example, in a residential application, icons are displayed for such things as overhead garage doors, security systems, automatic gates, VCRs, television, and stereos.

In another aspect of the invention, a receiving station such as a host computer or peripheral interface has IR capabilities to communicate data directly from a nearby μPDA with an infrared interface. In a further embodiment the μPDA may interface in a cellular network and act as a wireless modem.

PERIPHERALS

A μPDA may serve as the platform for various peripheral attachments via expansion port 20 (FIG. 1B and others). Upon attachment to a peripheral, a dedicated pin or pins within expansion port 20 signal microcontroller 11, and a peripheral boot-strap application is executed. Interfacing control routines, which may reside in the peripheral or in the memory of the μPDA, are then executed, and the μPDA I/O interface displays the related menu-driven options after the linking is complete.

Scanner

Figure 14:
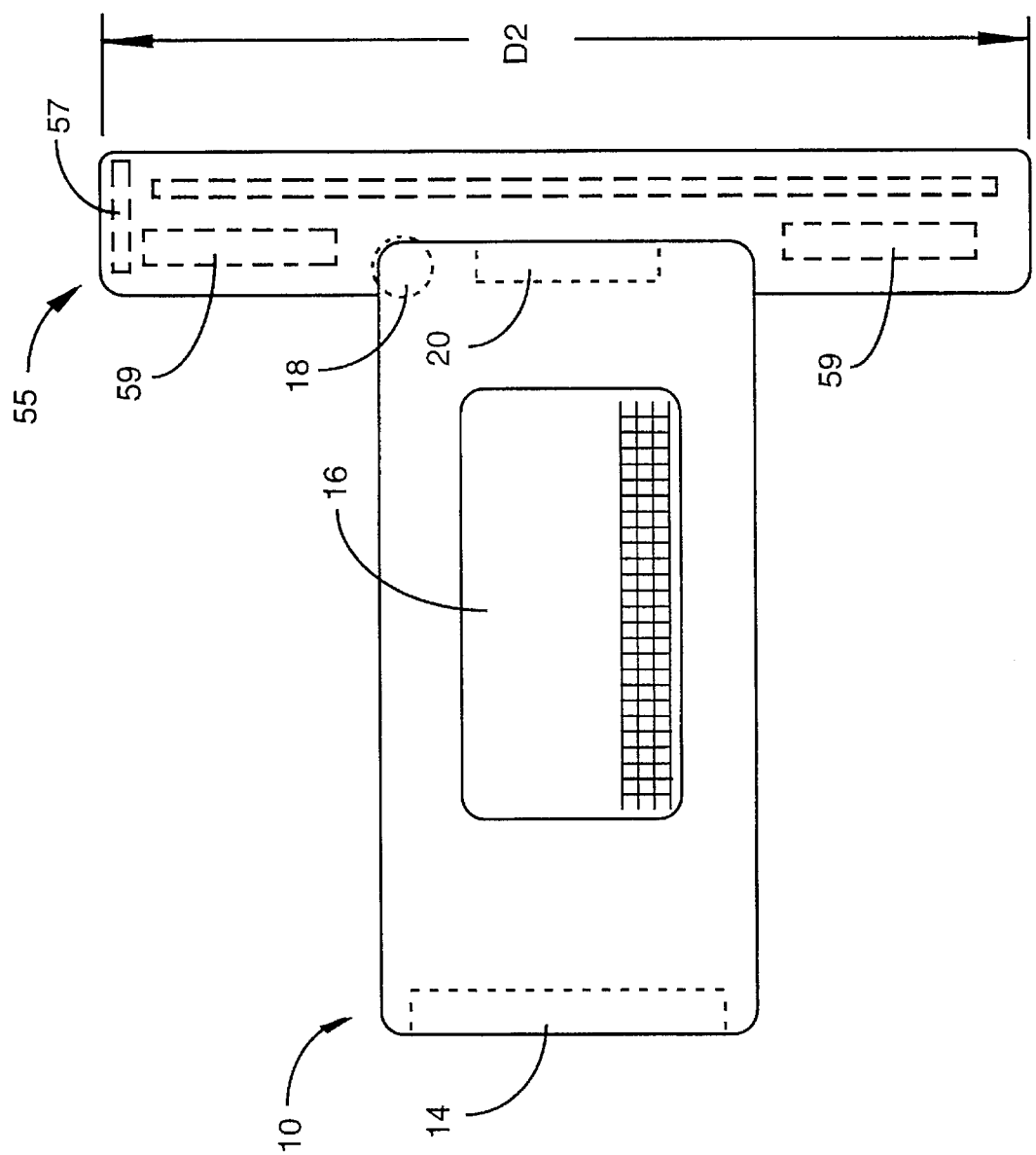
FIG. 14 is a plan view of a μPDA with a scanner attachment according to an embodiment of the present invention.

FIG. 14 is a plan view of a μPDA 10 with a scanner attachment 55 according to an embodiment of the present invention. The scanner attachment is assembled to the μPDA, making electrical connection via expansion port 20. In this embodiment the physical interface of the scanner is shaped to securely attach to the μPDA. Scanner attachment 55 has a roller wheel 57 or other translation sensor, which interfaces with wheel 18 of the μPDA, providing translation sensing in operation for the resulting hand-held scanner. In another aspect, scanner attachment 55 has a translation device which transmits the proper signal through expansion port 20. The scanner bar is on the underside, and one or more batteries 59 are provided within the scanner attachment to provide the extra power needed for light generation.

In the scanner aspect of the invention, scanner attachments 55 of different width D2 may be provided for different purposes. The bar may be no wider than the μPDA, or may be eight inches or more in width to scan the full width of U.S. letter size documents, or documents on international A4 paper. Unique control routines display operating information on the μPDA's I/O area 16 for scanning, providing a user interface for setup of various options, such as the width of the scanner bar, and providing identification for files created in the μPDA memory as a result of scan passes. Scanned data stored in the μPDA memory may be quickly transferred to the host via host interface 14 when the μPDA is docked. Unique routines may be provided to automate the process, so the user does not have to search for files and initiate all of the transfer processes.

Facsimile Option

Figure 15:
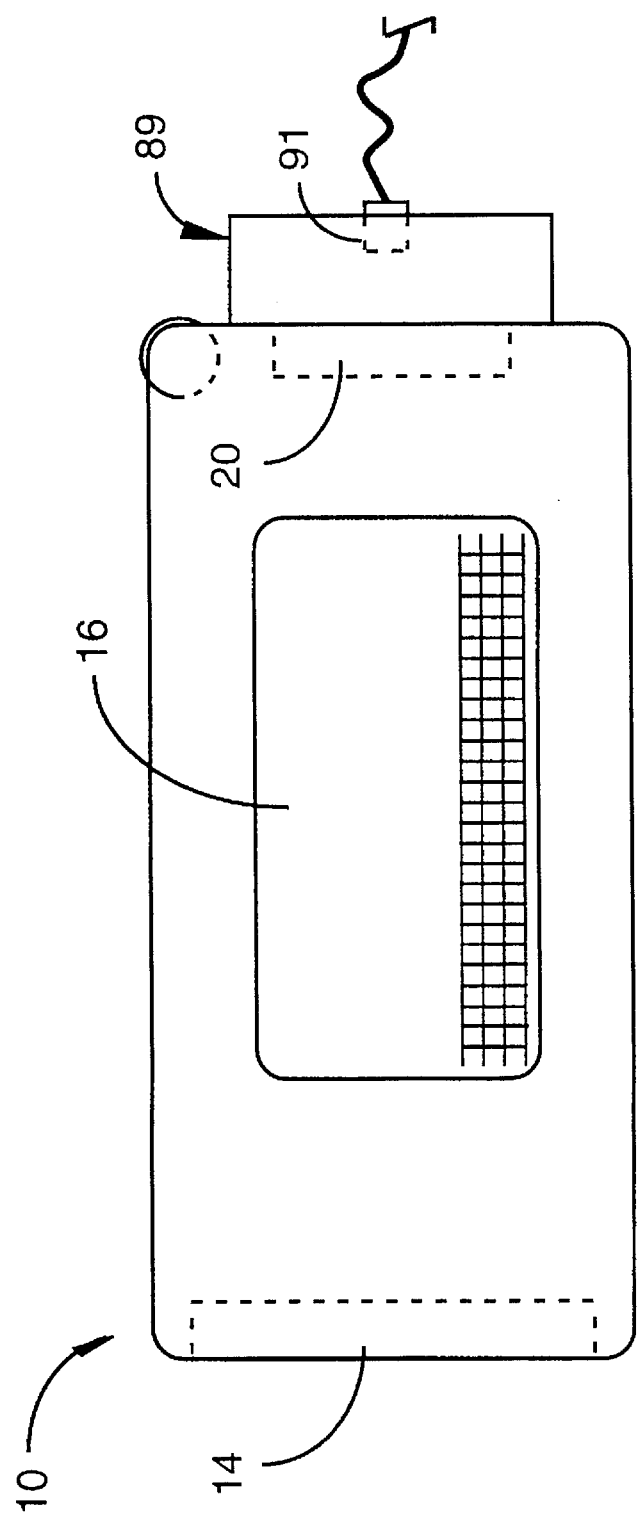
FIG. 15 is a plan view of a μPDA with a fax-modem attached according to an embodiment of the present invention.

FIG. 15 is a plan view of a μPDA with a fax-modem module 89 attached according to an embodiment of the present invention. A fax and telecommunication capability is provided via conventional telephone lines to the μPDA by fax-modem 89 interfacing to expansion bus interface 20. The fax-modem has internal circuitry for translating from the bus states of the expansion bus to the fax protocol, and a phone plug interface 91. In another aspect, the μPDA can be docked in a host and be used in combination with fax-modem 89 to provide faxing and file transfers of both host and μPDA data files. In this case, the fax-modem routines are displayed on the host monitor.

Printer

Figure 16:
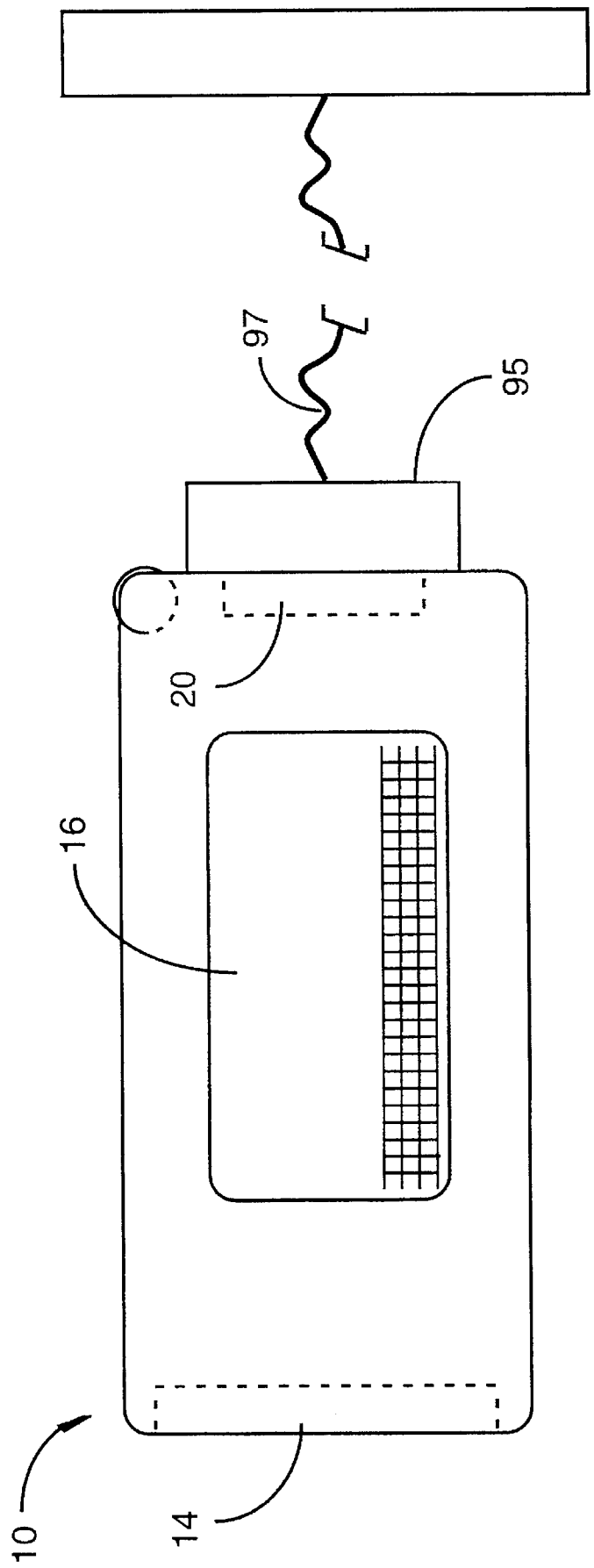
FIG. 16 is a plan view of a μPDA with a printer adapter interface according to an embodiment of the present invention.

FIG. 16 is a plan view of a μPDA with a Centronics adapter interface according to an embodiment of the present invention. A printer connector 93 engages expansion interface 20 by a connector 95 through a cable 97. Translation capability resides in circuitry in connector 93, which is configured physically as a Centronics connector to engage a standard port on a printer.

Barcode Reader and Data Acquisition Peripheral

Figure 17:
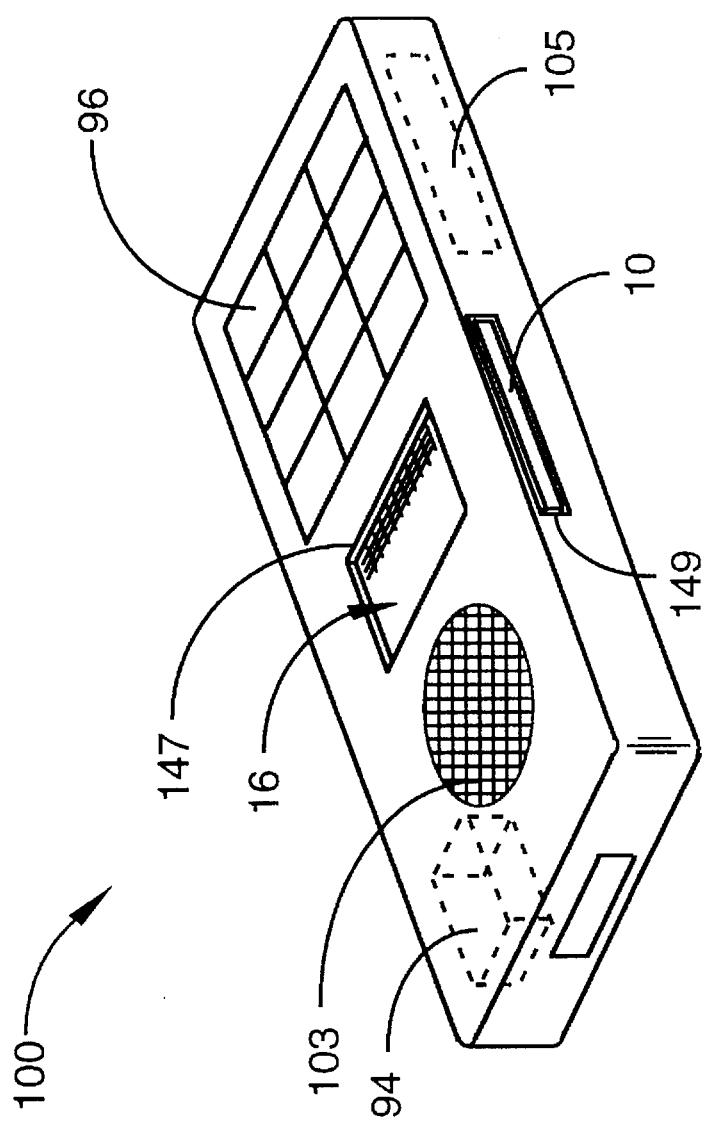
FIG. 17 is an isometric drawing of a μPDA docked in a barcode reader providing a data acquisition peripheral according to an embodiment of the present invention.

FIG. 17 is an isometric view of a μPDA 10 docked in a barcode reader and acquisition peripheral 100 according to an embodiment of the present invention. μPDA 10 is docked in docking bay 149. I/O interface 16 displays information through opening 147 according to specialized data acquisition applications. In this particular embodiment peripheral 100 has an IR interface 94, a microphone 103, a scanner port 101 (not shown), battery pack 105, and a numeric keypad pad 96 implemented as a touch-sensitive array.

Application routines enable the data acquisition peripheral to operate as, for example, a mobile inventory management device. The user may scan barcode labels with scanner 101 and enter information, such as counts, on keypad 96 or by voice input via microphone 103. Since applications of peripheral 100 are very specialized, only a limited voice recognition system is needed. The voice recognition system may prompt other command routines within the master applications as well.

As inventories are collected, the database may be displayed and also manipulated directly via I/O area 16 in open bay 147, or information may be downloaded at a prompt to a nearby host via IR interface 94.

Alternatively to frequent data transmission, data may be stored or an auxiliary option memory location in peripheral 100.

In another aspect, the data acquisition peripheral may be interfaced to the analog output of a monitoring device, such as a strip chart recorder, and may digitize and store the incoming analog signals.

Solar Charger

Figure 18:
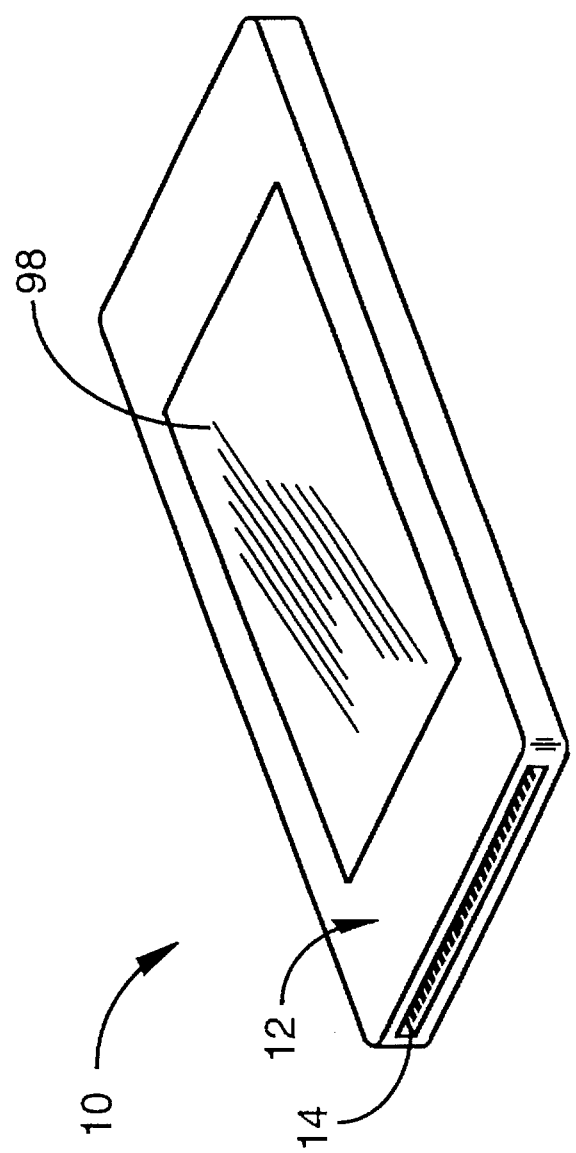
FIG. 18 is an isometric view of a μPDA with a solar charger according to an embodiment of the present invention.

FIG. 18 is an isometric view of the side of a μPDA 10 opposite the I/O interface with a solar charger panel 98 according to an embodiment of the present invention. Panel 98 is positioned so that when μPDA 10 is in strong light, such as sunlight, the solar charger absorbs the solar energy and converts it to electricity to recharger battery 15 inside the μPDA. Solar charger 98 may be permanently wired to the circuitry of the μPDA or attached by other means and connected to a dedicated electrical port or the expansion port. The solar charger is placed so that the μPDA can be fully docked in a docking port with the panel in place. In another aspect, a detachable solar charger may be unplugged before docking the μPDA, and the detachable charger may then be of a larger surface area.

Games/Conference Center

Figure 19:
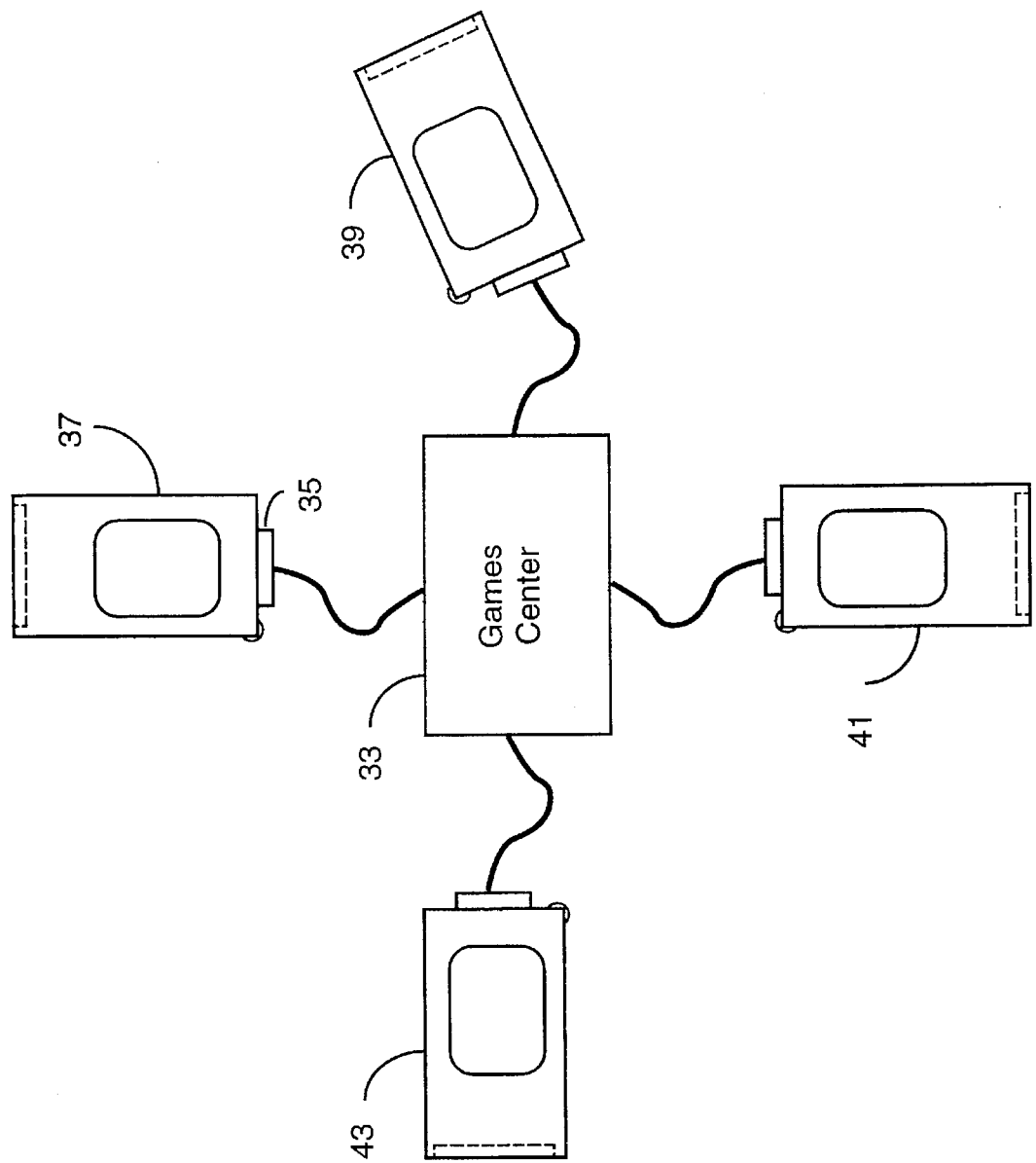
FIG. 19 is a plan view of four μPDAs interfaced to a dedicated network console providing inter-PDA communication according to an embodiment of the present invention.

FIG. 19 is a largely diagrammatic representation of a Games Center unit 33 according to an aspect of the invention for connecting several μPDA units (37, 39, 41, and 43) together to allow competitive and interactive games by more than one μPDA user. Games Center unit 33 is controlled by an 80486 CPU in this particular embodiment. μPDAs may be connected to the central unit by cable connection via the expansion bus or the host interface of each μPDA, through a connector such as connector 35. The drawing shows four connectors, but there could be as few as two, and any convenient number greater than two.

As a further aspect of the present invention, the gaming center may serve as a conference center where a number of μPDAs may exchange information. In this way, for example through custom routines stored and executable in central unit 33, a manager may update a number of salespeoples' μPDAs, including but not limited to merchandise databases, spreadsheets, price sheets, work assignments, customer profiles, address books, telephone books, travel itineraries, and other related business information while in conference.

Standard Keyboard

Figure 20:
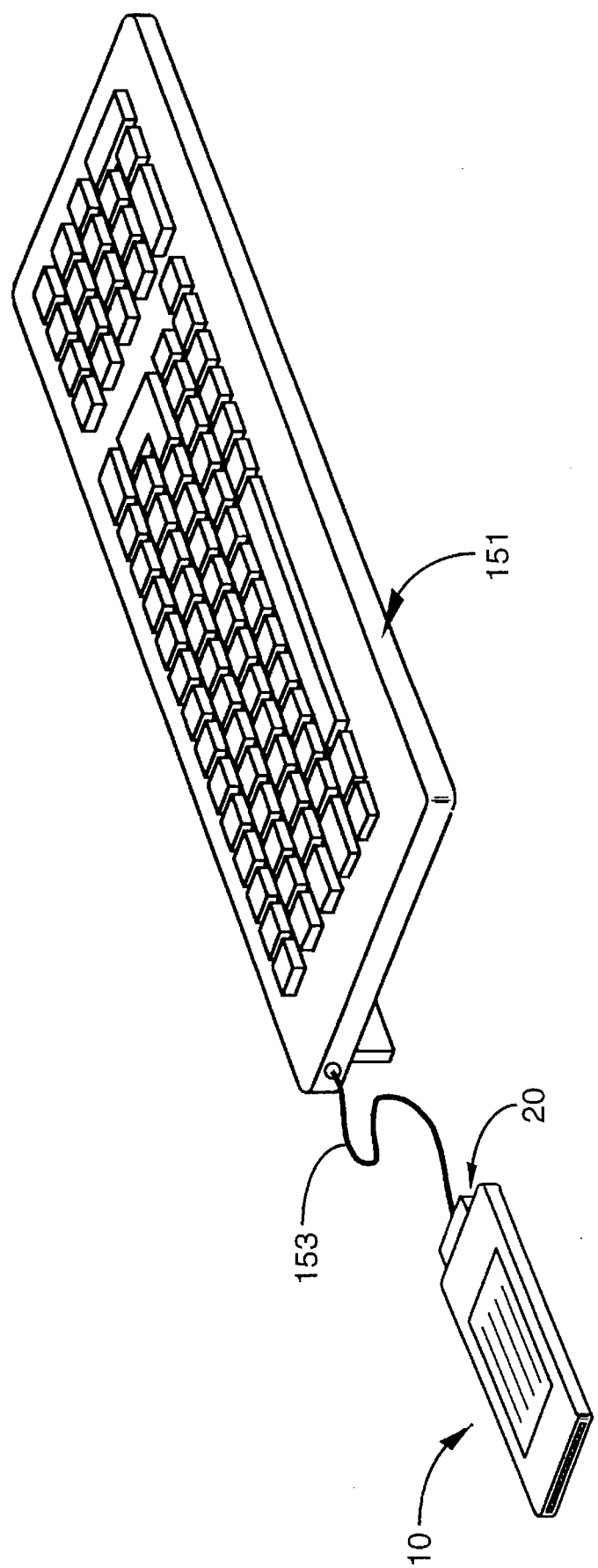
FIG. 20 is an isometric view of a μPDA according to the invention connected by the expansion port to a standard-sized keyboard.

FIG. 20 is an isometric view of a keyboard 151 connected by a cord and connector 153 to a μPDA 10 via the expansion port 20. In this example, the keyboard is a mechanical keyboard having a full-size standard key array and an on-board controller and interface for communicating with the μPDA. In other embodiments the keyboard may take many other forms, including a two-layer, flexible, roll-up keyboard as taught in U.S. Pat. No. 5,220,521.

In addition to keyboards, other input devices, such as writing tablets and the like may also be interfaced to a μPDA via expansion port 20.

There are numerous additional ways to combine different embodiments of the μPDA for useful functions. For example, an IR-equipped μPDA attached to scanner 55 may transfer large graphic files in near real time to a host computer. If the files were of text, the host may further process the files automatically through an optical character recognition (OCR) application and send the greatly reduced ASCI files back to the μPDA. As discussed above, the μPDA family of devices establishes a protocol of software security and distribution as well as having the ability to be bus mastered by a host computer system for numerous applications.

Expansion Bus Interface

An optional expansion bus 20 is described above in several sections with reference to FIG. 3 and to FIG. 6. A candidate expansion bus system called by the inventors an extended enhanced parallel port ($E^2P^2$) is described in detail below.

General Description

The expansion interface aspect of the invention in one embodiment is termed $E^2P^2$ by the inventors, and is an expansion bus interface for small computer systems. $E^2P^2$, in a broad sense, comprises master circuitry in the host computer for interfacing to the expansion, or I/O bus, slave circuitry for interfacing to an external ISA expansion bus (X-ISA) and a multiplexed $E^2P^2$ bus between the two, multiplexing data, address and status information over a byte-wide pathway. Both the master and the slave circuitry interface to the $E^2P^2$ bus as well.

In some cases the X-ISA bus amounts to a single ISA compatible device connected to the slave circuitry. For example, $E^2P^2$ permits attachment of standard ISA bus I/O port devices to a host computer via a cable connection to the parallel port connector. $E^2P^2$ buffering and control circuit devices multiplex required I/O address, data and control signals over a byte-wide cable interface independently of host computer device control program steps. The cable interface, which is the $E^2P^2$ bus, is preferably a Centronics-type printer cable. $E^2P^2$ is also compatible with device control program steps and external devices intended to operate according to SPP and EPP standards.

$E^2P^2$ supports the following subset of ISA bus signals over the multiplexed intermediate bus, and synthesizes them in the external X-ISA bus:

| SD[0 . . . 15] | DACK2/ | SA[0 . . . 9] | TC |
| IOCS16/ | IRQ[5 . . . 7] | IOCHRDY | IRQ15 |
| IOR/ | RESET | IOW/ | BCLK |
| AEN | OSC | DRQ2 | ALE |

$E^2P^2$ and a Single Peripheral Device

Figure 21:
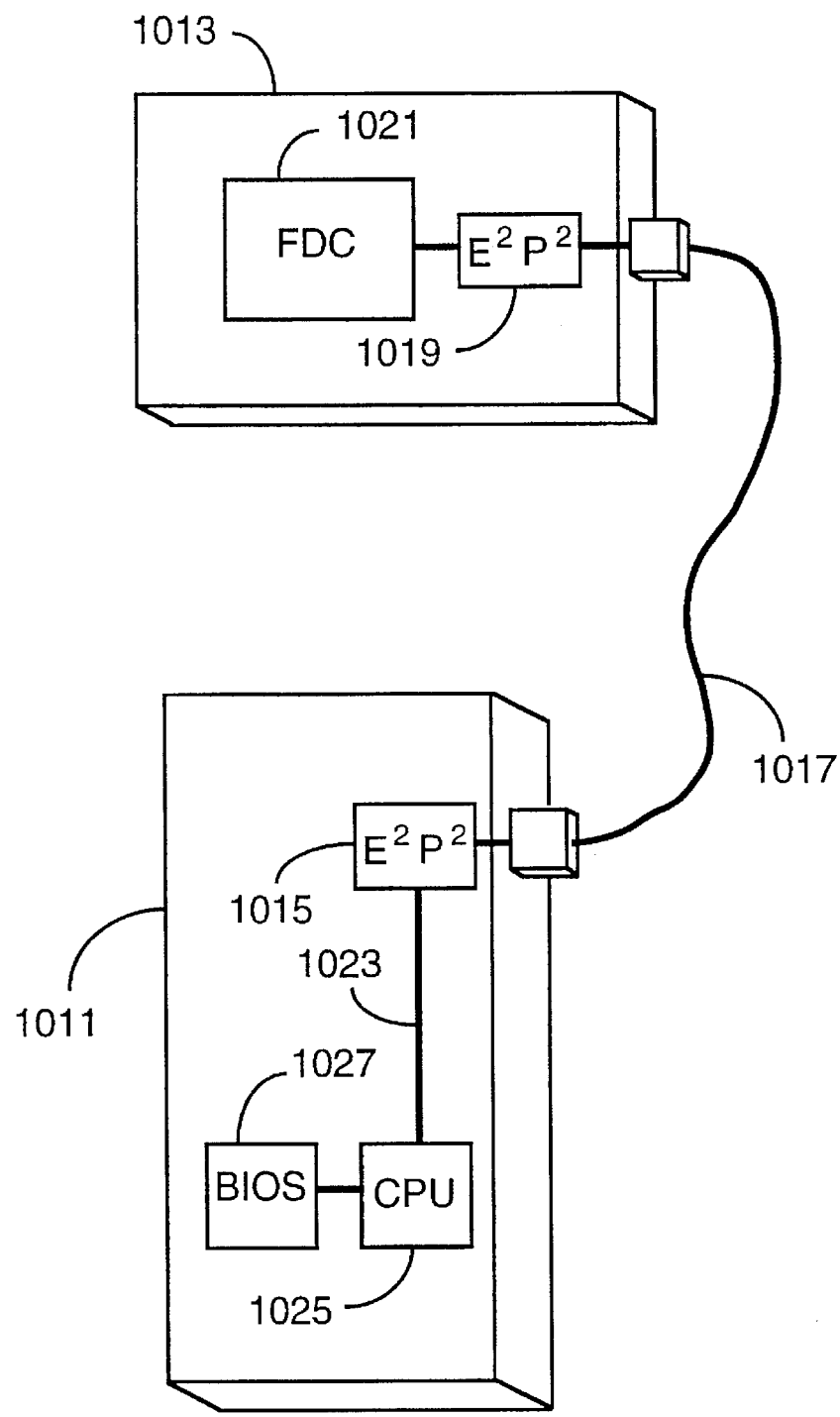
FIG. 21 is a largely schematic representation of a computer with an external disk storage device connected through a PIO port and signal cable according to the present invention.

FIG. 21 shows an embodiment of the present invention for a computer 1011 and an external floppy disk drive 1013. An $E^2P^2$ host port 1015, comprising master circuitry according to the invention, multiplexes and demultiplexes I/O address, data and control signals transmitted over a cable 1017 having 25-pin connectors and 25 conductors plus a shield, to slave circuitry 1019 of the $E^2P^2$ system. There is also provision in a preferred embodiment for transmitting power over the cable. The slave circuitry interfaces the cable bus back to ISA standard bus protocol. In a preferred embodiment the master portion of the $E^2P^2$ system is rendered as a first application specific integrated circuit (ASIC) and the slave portion is rendered as a second ASIC.

Slave circuitry 1019 comprises two state machines. One of these realizes a subset of an ISA bus state machine. The other translates between ISA bus states and $E^2P^2$ bus states. $E^2P^2$ host port 1015 has multiple operating modes, which are described below. A floppy disk controller 1021 interacts with the X-ISA bus state machine exactly as though it were connected to a host computer ISA bus, such as bus 1023. The $E^2P^2$ extended expansion system, once configured, is completely transparent to standard AT device driver software for a list of supported devices (see FIG. 29).

A physical embodiment of an X-ISA bus is optional in an embodiment such as FIG. 21. The physical implementation of the bus is generally not required where one device, such as the floppy disk device shown, is tethered to the host port. CPU 1025 executes floppy disk control program steps in a BIOS 1027 and interacts with the floppy disk exactly as it would if floppy disk controller 1021 were physically connected to the host computer ISA bus 1023. It will be apparent to one with skill in the art that other peripheral devices such as a hard disk drive or network adapter might replace the floppy disk drive and controller in alternative embodiments of a single device connected to the host port.

In $E^2P^2$ an external peripheral device according to the invention that lack a power supply can draw current at +5 volts to power the device from $E^2P^2$ host port 1015 via a conductor in cable 1017. Details of this power circuitry are described below.

$E^2P^2$ With a Docking Box

Figure 22:
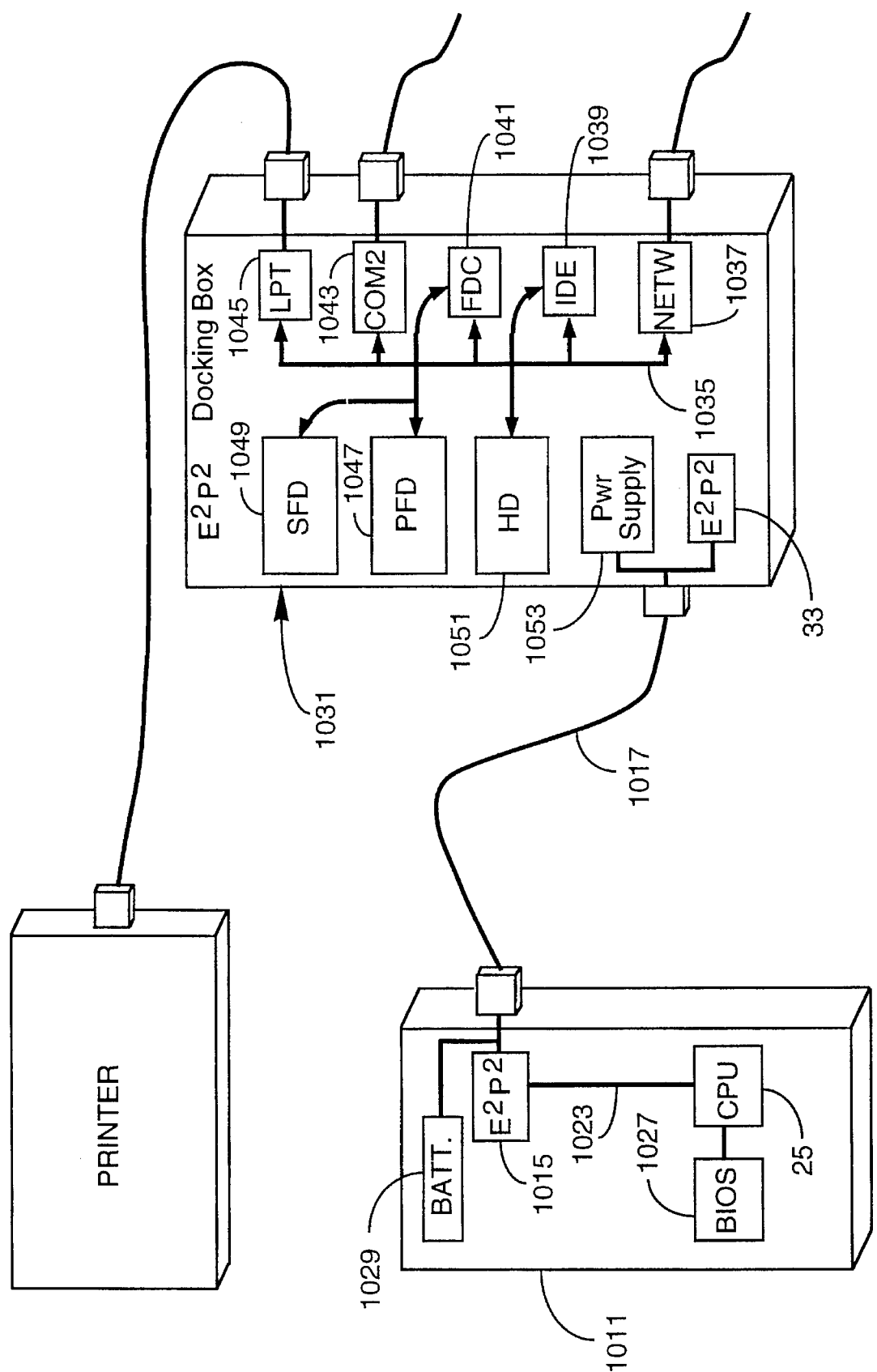
FIG. 22 is a largely schematic representation of a computer connected by a PIO port and a signal cable to a docking box according to the present invention.

FIG. 22 shows another embodiment of the present invention in which cable 1017 connects $E^2P^2$ host port 1015 of computer 1011 to a docking box 1031 comprising an X-ISA controller 1033, an X-ISA bus 1035, a network adapter 1037, an integrated device electronics (IDE) interface 1039, a floppy disk controller 1041, a serial communication port 1043, a parallel printer port 45, a primary floppy disk drive 1047, a secondary floppy disk drive 1049, a secondary hard disk drive 1051, and a power supply 1053. X-ISA controller 1033 provides a bridge between the $E^2P^2$ bus of cable 1017 and the X-ISA bus 1035. X-ISA bus 1035 is a typical ISA bus with multiple plug-in card connectors.

CPU 1025 controls the states of the peripheral devices on bus 1035 using the same program steps in BIOS 1027 that it would use if these devices were attached to ISA bus 1023. A battery 1029, which supplies power for computer 1011 when the computer is disconnected from external power sources, may receive up to 4 amperes of +12 volt charging current from power supply 1053 while operating with docking box 1031 connected via cable 1017.

Figure 23:
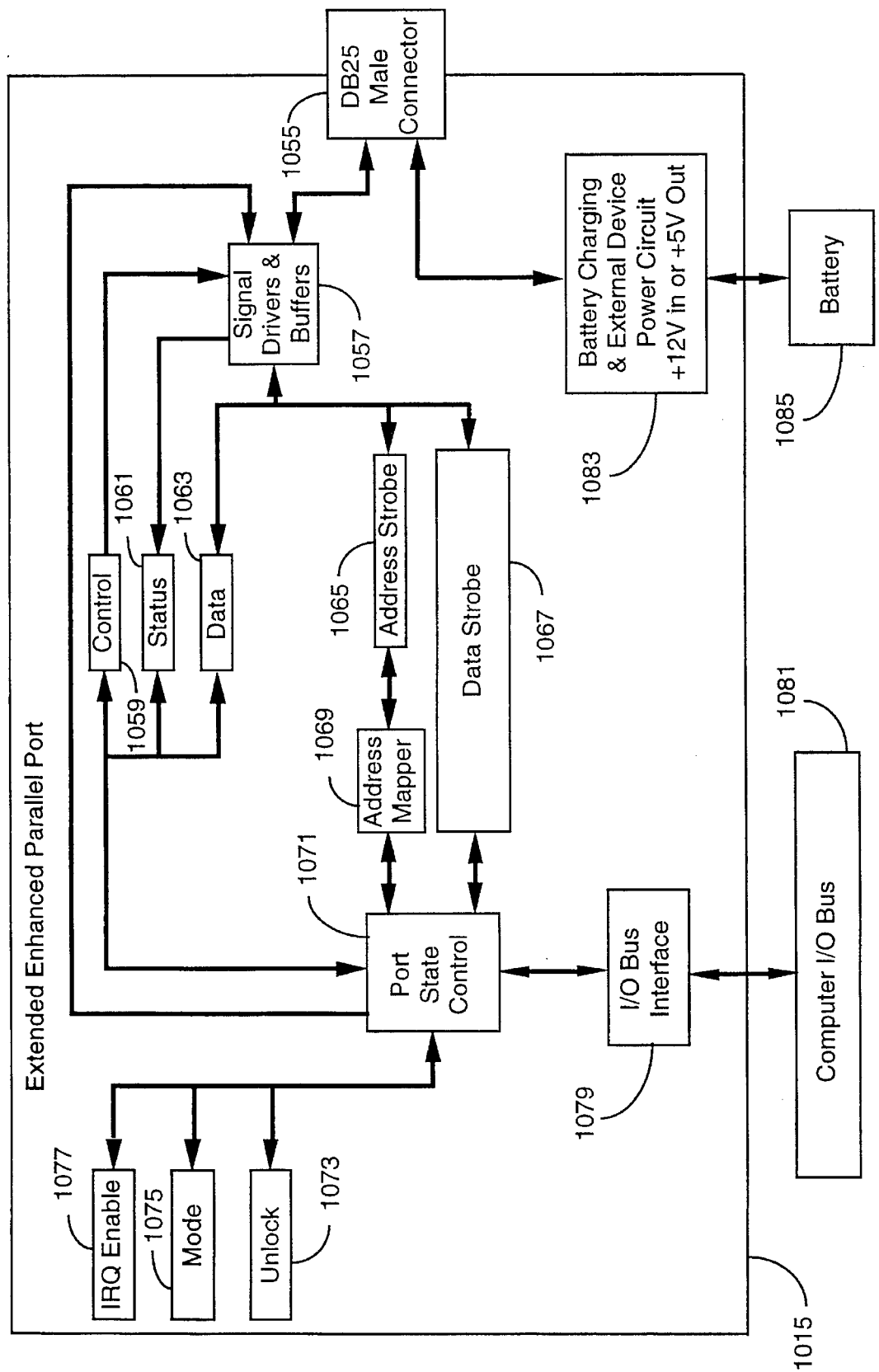
FIG. 23 is a largely schematic representation of a PIO port interface according to the present invention.

FIG. 23 illustrates an embodiment of $E^2P^2$ host port 1015 of the present invention; that is, the master portion of the $E^2P^2$. A 25-pin cable connector 1055 mates with a complementary connector on cable 1017. A set of signal line drivers and buffers 1057 interfaces cable 1017 to a Control Register 1059, a Status Register 1061, a Data Register 1063, and an Automatic Address Strobe Register 1065, all of which are 1-byte (8-bit) registers, A 4-byte Automatic Data Strobe Register 1067 is also interfaced to cable 1017 by line drivers and buffers 1057. The contents of the Automatic Data Strobe Register 1067 may be addressed by byte or word. An Address Mapper 1069 interfaces the Automatic Address Strobe Register 1065 to a State Control and Data Router 1071. The State Control and Data Router 1071 also interfaces all the other registers listed above plus an Unlock Register 1073, a Mode Register 1075 and an IRQ Enable Register 1077, which are 16-bit port-control registers, to an I/O Bus Interface 1079. I/O Bus Interface 1079 comprises bus driver and receiver devices for interfacing to a computer I/O bus 1081.

Unlock Register 1073 controls host write access to the other registers, After hardware reset the other registers are write protected, Writing the data pattern OOA5/h to the Unlock Register enables them. Writing any other value to the Unlock Register will restore write protection.

A table of functions controlled by bits of Mode Register 1075 of FIG. 23 is shown in FIG. 25. Bits 0–2 control the operating mode of $E^2P^2$ 1015. By using the binary decimal value of bits 0–2 as an indicator, up to eight operating modes are indicated as shown in FIG. 25. For example, if the decimal value of the binary representation of bits 0–2 is 3 (011), then the mode is $E^2P^2$. Bits 3–5 select the data width of network adapter ports zero and one and option port zero. Bits 6 and 7 are reserved. Bits 8–15 control ISA bus to $E^2P^2$ port address mapping and IRQ enables for the ports listed.

FIG. 26 shows a table of ISA bus IRQ levels for use by X-ISA bus port devices. These are controlled by bits 8–11 of IRQ Enable Register 1077, with bit 1013 reserved for future use for IRQ4. A set bit enables the corresponding IRQ level. Bit 1012 is used for Clock Off and Clock On.

Power Transfers

In $E^2P^2$ mode an external port power circuit (XPPC) 1083 connects between the +5 volt power supply of computer 1011 and pin-18 or 19 of 25-pin cable connecter 1055 that is defined as a ground pin for SPP and EPP modes, as shown in FIG. 27. XPPC 1083 supplies +5 volt power to unpowered external devices, such as external floppy disk 1013. In an embodiment of $E^2P^2$ host port 1015 for a battery powered computer, XPPC 1083 also allows X-ISA controller 1033 to supply up to 4 amperes of +12 volt charging current to battery 1085 from a power supply 1053 while the $E^2P^2$ external port 1033 is activated.

Figure 24:
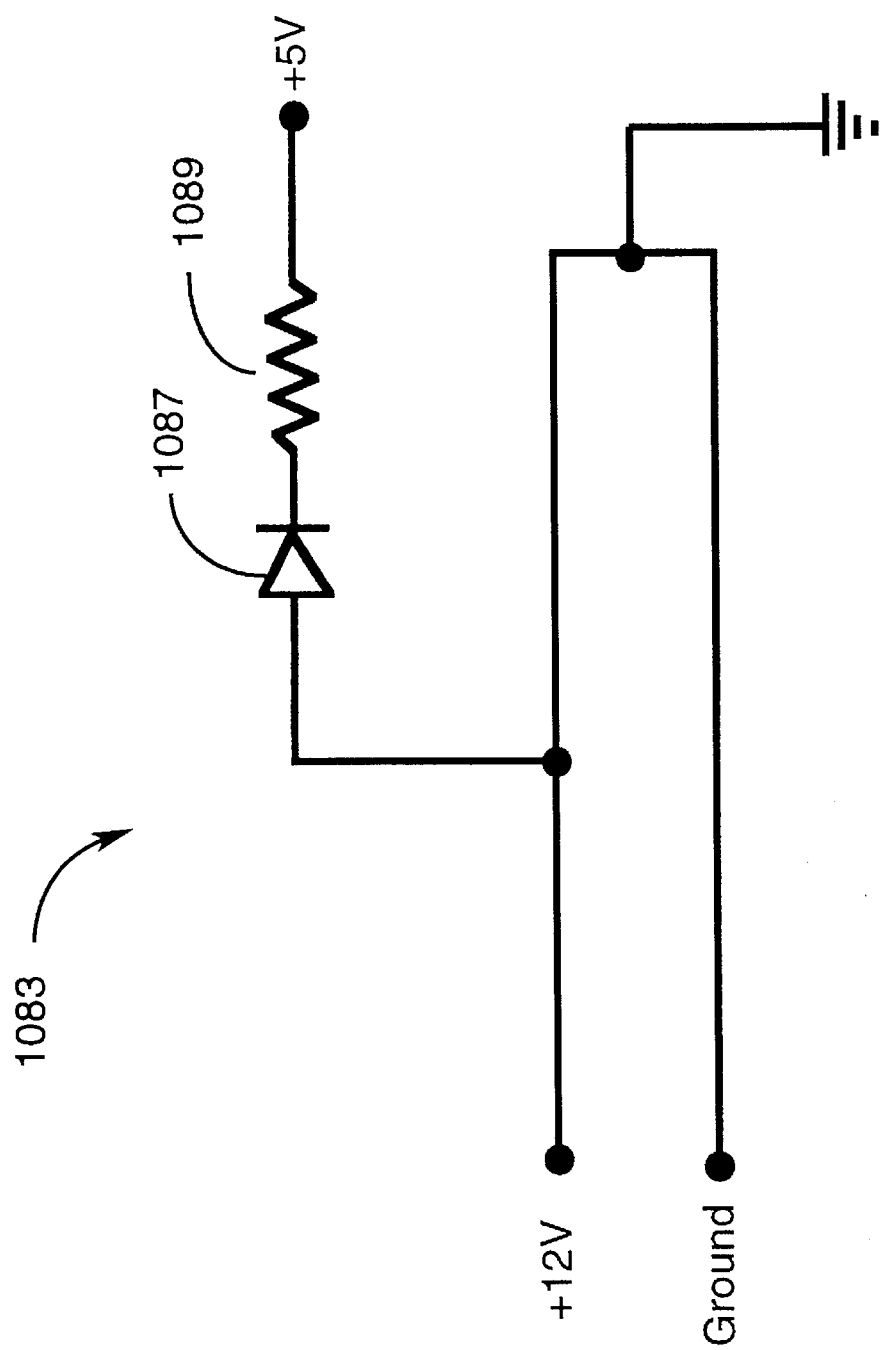
FIG. 24 is a schematic diagram showing a battery charging circuit for the PIO port of FIG. 23.

FIG. 24 shows an embodiment of XPPC 1083. A diode 1087 allows current to be drawn from the positive pole of +5 volt battery 1085 (FIG. 3), thus causing the battery to charge, when +12 volts is applied to pin-18 of cable 1055 by power supply 1053. Diode 1087 prevents a short circuit of battery 1085 by attachment of cable 1055 to an external device that grounds pin 18 of cable 1055. A resistor 1089 connected between pin 18 of cable 1055 and system ground provides a regulating load to power supply 1053.

A table showing the $E^2P^2$ bus cable connector pin to register connections and signal designations for all three modes of operation of $E^2P^2$ is shown in FIG. 27. One with skill in the art will recognize that the signal designations for SPP and EPP modes are compatible with devices built for those modes of operation.

$E^2P^2$ mode uses the data lines on pins 2–9 to multiplex external device address and data as do EPP devices, but also uses them to communicate IRQ state information. $E^2P^2$ mode allows the $E^2P^2$ bus state machine to use control and status lines, pin 1 and pins 10–16, for bus control signals of the $E^2P^2$ bus. Pins 12–15 carry $E^2P^2$ bus cycle (CY) signals. $E^2P^2$ mode switches the pins 1 and 16 line drivers from open ended to differential drive with positive drive voltage on pin 16 and negative drive voltage on pin 1. This differentially driven circuit carries the bus strobe pulse. One with skill in the art will recognize that there is improved noise immunity offered by this arrangement. $E^2P^2$ mode also activates connection of XPPC 1083 to pin 18 and 19. Pins 20–25 are connected to chassis ground in all three parallel port operating modes.

$E^2P^2$ supports a subset of the ISA peripheral status lines. These are:

| IRQ[5 . . . 7] | IRQ15 | DRQ2/DACK2 |

These status lines are monitored by the slave portion of the system. Whenever there is a change in status the $E^2P^2$ signal INTR is asserted to the host $E^2P^2$ device. At the completion of the current $E^2P^2$ cycle the host $E^2P^2$ device will perform a status read cycle followed immediately by a write cycle to a Status Image Register in the slave circuitry. When the Status Image Register matches the current state of the X-ISA status lines, the slave de-asserts the INTR signal.

FIG. 28 displays the $E^2P^2$ AD cycles by type and corresponding hex value on the CY lines.

FIG. 29 is a table indicating peripheral I/O devices supported by $E^2P^2$ in the embodiments described herein. I/O device address translation mapping between 10-bit ISA bus values and 8-bit $E^2P^2$ bus values are indicated. Other embodiments might use different mappings for the same I/O devices or map a different set of I/O devices. 16-bit data values are multiplexed through the $E^2P^2$ bus as two consecutive 8-bit values. When a program step causes CPU 25 to address an I/O address in column 2 of the table and the enable bit for that device is set in Mode Register 1075, port state controller 1071 routes the I/O address bits to address mapper 1069, which performs the address translation and loads the 8-bit address value into Address Strobe Register 1065.

In FIG. 29 the following abbreviations are used:
NET=Network Device
OPT=Optional Device
SHD=Secondary Hard Disk Controller
SFDC=Secondary Floppy Disk Controller
LPT=Line Printer
PFDC=Primary Floppy Disk Controller
PHD=Primary Hard Disk Controller In operation a computer equipped with $E^2P^2$ employs a start up routine that comprises a "tickle" operation for querying the parallel port(s) to discover the nature of devices connected thereto. Typically the tickle routine is a program step or steps in the computer BIOS for sending a code to one of the pins on the parallel port. The tickle code could be a series of logical high signals in a specified period of time, or some other code.

As an operating example, an $E^2P^2$ computer with an external floppy disk connected to the parallel port would tickle the port (at a specific pin) on start up, and the External floppy would, if equipped for $E^2P^2$, answer on a "handshake" line, whereupon the start up routine would set the operating mode for $E^2P^2$. The tickle routine could similarly discover if the mode should be EPP or SPP.

DMA Prefetch

Memory devices such as disk drives using $E^2P^2$ are always remote, connected either singly over a cable of up to three meters, or in, or tethered to, a docking box communicating through a cable and $E^2P^2$ interfaces. This remote placement, as opposed to local placement for typical conventional systems, poses a memory access problem that is handled through firmware at the $E^2P^2$ host interface circuitry.

Data transfer from a floppy disk device to the host system is exemplary. In a conventional system the floppy controller is installed locally, i.e in the same frame as the host system. For every byte of data to be transferred from the floppy to the host during a floppy read operation, the floppy controller first makes a data request signal (DRQ) to the system's DMA controller. There is no indication from the floppy controller whether this is a request to read data or to write data. The DMA controller is pre-programmed by the system software to respond with either a read or a write acknowledge signal.

In the $E^2P^2$ implementation the floppy controller is remote, communicating over a cable of up to three meters in length. In this case, when the floppy controller makes a data transfer request for a read operation, the $E^2P^2$ host circuitry intercepts the request and gets the data from the floppy controller before passing the request on to the host system. This is necessary because a device making a DMA transfer request to the system is required to have the data ready for writing to system memory at the time of the request. In the case of the remote floppy communicating over the $E^2P^2$ cable some time is required to transfer the data ever the cable. So the $E^2P^2$ system is configured to prefetch the floppy data before making the transfer request to the host system.

When $E^2P^2$ sees the initial DRQ signal from the floppy controller it has to have some way of knowing whether the request is to read data or to write data. Only the DMA hardware "knows" for sure, as a result of host system programming. Accordingly, the $E^2P^2$ is configured with "trap" hardware to watch for the specific host system instruction to the DMA that sets it up for servicing floppy read data requests. When this instruction is trapped, then the $E^2P^2$ system knows to respond to the next series of DRQ's as read requests and to prefetch the data from the floppy and present it to the system bus before passing on the DRQ to the system DMA controller. The inventors refer to this capability as a "premonition pipeline".

After intercepting a read setup command for DMA, $E^2P^2$ continues to interpret DRQ's from the floppy as read requests until another command that is not a read setup command to the DMA is intercepted.

Pinouts

In a preferred embodiment, as described above, the $E^2P^2$ master circuitry at the host system end is implemented as an ASIC, and the slave circuitry at the remote end of the $E^2P^2$ bus is implemented as a second ASIC. FIG. 30 and 31 comprise a pinout listing for the host master ASIC in this embodiment, FIG. 30 listing pins 1–40, and FIG. 31 listing pins 41–80.

Relative to the master chip in this embodiment, when the chip is powered down (VCC=0 volts), all pins that are designated as having OS24/12 or OS24 outputs must be capable of sinking 22 milliamps through their ESD diode to ground. The die must be able to sink this current indefinitely on all OS24/12 and OS24 output pins simultaneously. Additionally, all output drivers have slew rate limiting with a time constant of approximately 4 nanoseconds.

In addition to the above, OS16/4 indicates a tri-state driver that can sink 16 ma and source 4 ma. OS24/12 indicates a tri-state output driver that can sink 24 ma and source 12 ma. Pins PS2 and PS3 must sink and source 24 ma.

FIG. 32 is a pinout listing for pins 1–40 of the slave ASIC, and FIG. 33 is a pinout listing for pins 41–80 of the slave ASIC. Relative to the slave chip in this embodiment, when the chip is powered down (VCC=0 volts), all pins that are designated as having OS24/12 or OS24 outputs must be capable of sinking 22 milliamps through their ESD diode to ground. The die must be able to sink this current indefinitely on all OS24/12 and OS24 output pins simultaneously. Additionally, all output drivers have slew rate limiting with a time constant of approximately 4 nanoseconds.

In addition to the above, OS16/4 indicates a tri-state driver that can sink 16 ma and source 4 ma. OS24/12 indicates a tri-state output driver that can sink 24 ma and source 12 ma. Pins PS2 and PS3 must sink and source 24 ma. Also, OB16/4 indicates an output driver that can sink 16 ma and source 4 ma.

There is one register in the slave chip, the Status Image Register, mentioned briefly above. The data in this register is driven onto the AD[7:] wires when a Read Status Image cycle is performed on the slave. This register can be written via the AD[7:0] wires when a Write Status Image command is sent to the slave from the master. This register is not directly read/writable by the host system.

It will be apparent to those with skill in the art that there are many alterations in detail that might be made without departing from the spirit and scope of the invention. Some of these are described above. The scope of the invention is limited only by the breadth of the claims.

It will be apparent to one with the skill in the art that there are many changes that might be made and many other combinations that might be made without departing from the spirit and scope of the invention. There are, for example, many ways to implement the support structure of the μPDA, and to interconnect the active components. One way has been illustrated by FIG. 2 and described in accompanying text. There are many alternatives to this preferred structure. There is also a broad range of sizes and form factors that might be assumed by devices according to the present invention. The use of well-known PCMCIA form factors has been disclosed, but other sizes and forms might also be provided in alternative embodiments. In larger embodiments, on-board peripherals may be implemented.

In addition to these alternatives, there are various ways the connectivity of a μPDA bus might be provided. The well-known PCMCIA standard has been disclosed as a preference, but other connectivity may also be used in alternative embodiments. Memory types and sizes may vary. Means of providing a security code may vary. The nature of the internal bus may vary. An alternative for the optional expansion bus, called by the inventors the $E^2P^2$ bus, is disclosed in detail above. There are a number of other expansion bus structures and protocols that might be used. There are indeed many variations that do not depart from the spirit and scope of the invention.

What is claimed is:

1. A digital assistant I/O expansion system comprising:

a first enclosure defining the bounds of a digital assistant;

a CPU within the enclosure;

a memory coupled to the CPU;

a touchscreen combination I/O apparatus implemented on a surface of the enclosure;

an internal I/O bus coupled to the CPU and to an expansion connector in a surface of the enclosure;

an expansion bus external to the enclosure, the expansion bus having the width and parallel structure of the internal I/O bus;

an intermediate bus link connected to the expansion connector and to the expansion bus;

first state-translation circuitry connected to the internal I/O bus and to the intermediate bus link; and second state-translation circuitry connected to the intermediate bus link and to the expansion bus;

wherein the first state-translation circuitry translates and multiplexes bus signals appropriate to I/O peripheral devices from the internal I/O bus onto the intermediate bus link, and the second state-translation circuitry translates the signals on the intermediate bus link onto the expansion bus, providing on the expansion bus the signals and structure of the internal bus in a manner allowing the CPU to transact with peripheral devices connected to the expansion bus exactly as though they were connected on the internal I/O bus, requiring no dedicated device-driver software executed by the CPU.

2. A digital assistant I/O expansion system as in claim 1 wherein the internal I/O bus comprises an ISA standard bus, the expansion connector is a 25-pin standard parallel port (SPP) connector, and said intermediate bus link is a 25-conductor parallel cable with 25-pin connectors at each end.

3. A digital assistant I/O expansion system as in claim 1 wherein the second state-translation circuitry is incorporated into a peripheral I/O device, and wherein the second state-translation circuitry translates states between the intermediate bus link and a controller in the peripheral I/O device.

4. A digital assistant I/O expansion system as in claim 1 wherein the second state-translation circuitry is incorporated into a docking box connectable to the intermediate bus link, and the second state-translation circuitry drives a synthesized bus as the expansion bus within the docking box, realizing a subset of states of the internal I/O bus required to communicate with peripheral I/O devices without use of dedicated device-driver software by the CPU.

5. A digital assistant I/O expansion system as in claim 4 wherein the docking box further comprises one or more of a network port with an external connector for interfacing to a serial cable, a hard disk controller for connecting to a hard disk drive within the docking box, a floppy disk controller for connecting to a floppy disk drive within the docking box, a serial port with an external serial connector, and a printer port with an external connector for interfacing to a printer.

6. A digital assistant I/O expansion system as in claim 4 wherein the docking box includes a power supply, and wherein the intermediate bus link comprises pins connected to the power supply for supplying power to the connected digital assistant from the docking box via conductors of said intermediate bus link.

7. A digital assistant I/O expansion system as in claim 4 wherein said digital assistant is a portable computer having an on-board storage power supply and said docking box comprises a primary power supply connected to pins of said 25-pin connector, and wherein said primary power supplies power via conductors of said intermediate bus link to recharge said on-board storage power supply of said digital assistant.

8. A digital assistant I/O expansion system as in claim 1 wherein, on power-up and reset, the CPU tests devices connected to the expansion bus for compatibility with a standard parallel port (SPP) communication mode, a standard enhanced parallel port (EPP) communication mode, and with a proprietary $E^2P^2$ communication mode, and configures the first state-translation circuitry to operate in an appropriate mode according to the tested compatibility of the devices connected on the expansion bus.

* * * * *